United States Patent [19]

Bresnahan et al.

[11] 4,400,841
[45] Aug. 30, 1983

[54] APPARATUS AND METHOD FOR HANDLING SHEET MATERIAL

[75] Inventors: Roger M. Bresnahan; Paul D. Jepson, both of Toledo, Ohio

[73] Assignee: Libbey-Owens-Ford Company, Toledo, Ohio

[21] Appl. No.: 238,452

[22] Filed: Feb. 26, 1981

[51] Int. Cl.³ .................... B66C 1/28; C03B 23/02
[52] U.S. Cl. .................... 414/564; 294/67 BC
[58] Field of Search .............. 414/564, 751, 753; 294/67 BB, 88 BC, 67 BC; 198/486, 653, 494, 495, 694–696; 65/273

[56] References Cited

U.S. PATENT DOCUMENTS

| | | | |
|---|---|---|---|
| 1,178,829 | 4/1916 | Stone | 294/67 BC |
| 2,957,277 | 10/1960 | White et al. | 414/564 |
| 3,846,104 | 11/1974 | Seymour | 65/273 |
| 3,887,082 | 6/1975 | Posselt | 414/753 |
| 4,252,358 | 2/1981 | Klebs | 294/67 BB |

FOREIGN PATENT DOCUMENTS

| | | | |
|---|---|---|---|
| 2239408 | 2/1975 | France | 294/67 BC |
| 1058330 | 2/1967 | United Kingdom | 294/67 BC |
| 587076 | 1/1978 | U.S.S.R. | 294/67 BB |

OTHER PUBLICATIONS

IBM Technical Disclosure Bulletin, vol. 29, No. 9, Feb. 1979.

Primary Examiner—Robert B. Reeves
Assistant Examiner—James Barlow
Attorney, Agent, or Firm—Collins, Oberlin & Darr

[57] ABSTRACT

A sheet handling apparatus and method for transferring horizontally oriented sheet articles from one location to another in an automated production line facility. The apparatus includes a vertically reciprocal elevator mounted on a horizontally reciprocal carriage and provided with a sheet pick-up head including grippers engageable with and disengageable from the opposed marginal edges of one or more superimposed sheet articles. The apparatus is especially suited for precisely placing paired sheets of glass on bending molds advanced on a conveyor system beneath the pick-up head. The molds are located and locked in position on the conveyor system in vertical registry with the pick-up head during transfer of the sheets from the head to the mold.

15 Claims, 28 Drawing Figures

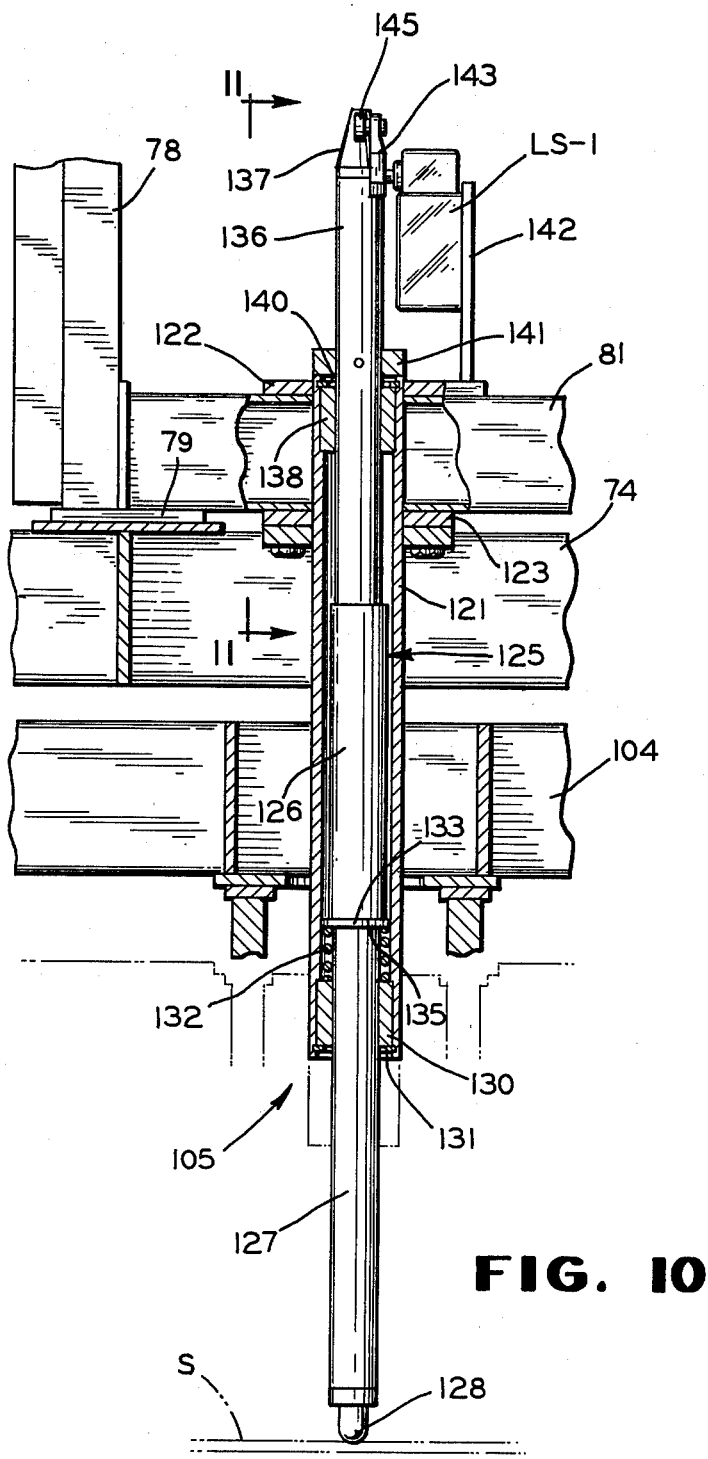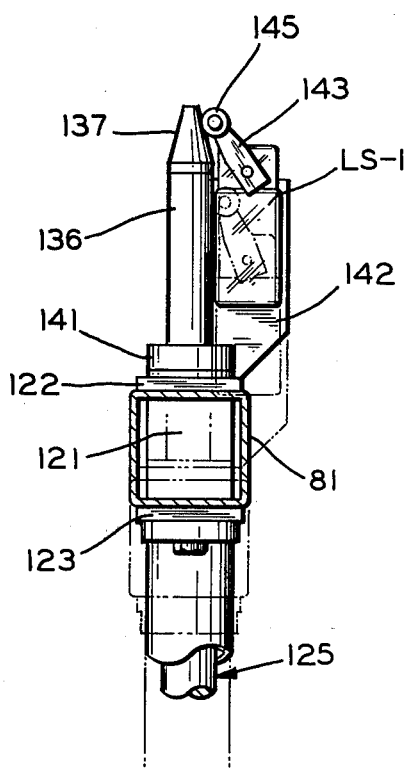
FIG. 10
FIG. 11

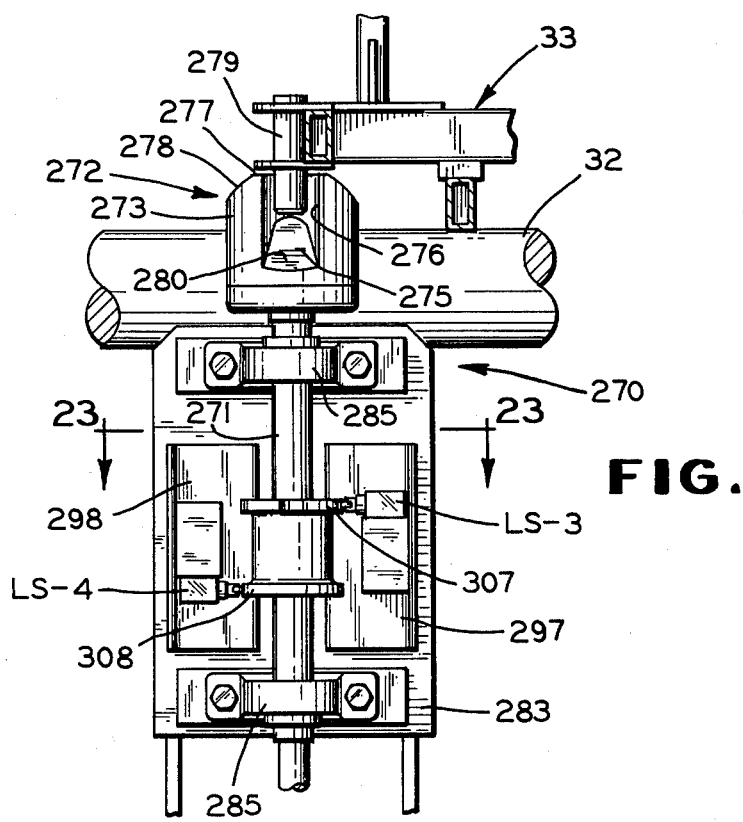
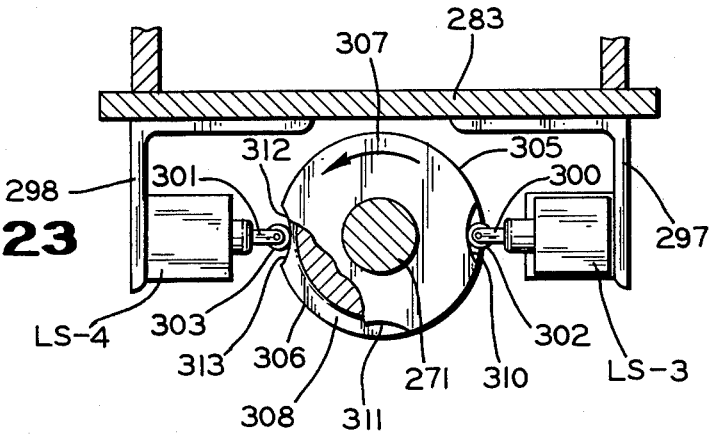
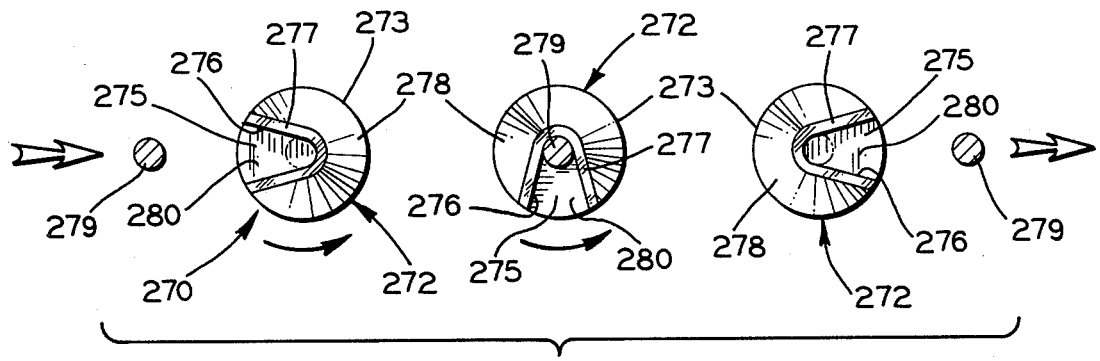

APPARATUS AND METHOD FOR HANDLING SHEET MATERIAL

BACKGROUND OF THE INVENTION

This invention relates generally to the material handling art and, more particularly, to apparatus for loading and unloading superimposed sheets of glass onto and from glass shaping molds.

In the production of bent laminated glass products, such as present-day automotive windshields for example, it has been found desirable to bend the two sheets of glass forming the windshield simultaneously in order to obtain the mutual fit and conformity required for the subsequent laminating operation. The common process for achieving this is to place paired, superimposed sheets of flat glass on a gravity-type mold and heat the glass sheets to their softening point, causing the sheets to sag by gravity into conformity with the shaping surface of the mold. The two flat sheets are slightly different in size to accommodate the final curved conformation so that the marginal edges of the superimposed curved sheets lie in a substantially common plane.

The heating and consequent bending is accomplished by advancing the glass-laden molds through a furnace in which the glass sheets are heated during their travel to a point where the glass sheets are softened and caused to sag by gravity into conformity with the mold shaping surfaces. At least two attendants are required to place or load the paired sheets onto the mold prior to entry into the furnace and at least two additional attendants are required at the exit end of the furnace to remove the bent sheets from the mold. Thus, four attendants are employed to load and unload the molds on each production line of a multi-line fabricating facility. It can be readily appreciated that such manual operations seriously impair efficiency in a mass production operation while adding materially to production costs. Also, the consequent fatigue and human error in properly placing the paired sheets of glass on the mold often results in glass breakage and/or improperly shaped finished products.

In order to overcome the above-noted shortcomings, it has been found desirable to develop an apparatus for automatically loading and unloading superimposed sheets of glass onto and from bending molds. However, conventional glass sheet transfer devices, such as vacuum cups and the like, are not feasible because both sheets must be handled simultaneously. Moreover, the glass sheet surfaces must be maintained clean and free of any marking or marring so that grippers in the form of mechanical or metal fingers, tongs etc. cannot be employed.

SUMMARY OF THE INVENTION

Accordingly, it is a primary object of the present invention to provide a new and useful sheet material handling apparatus for and method of automatically loading fresh glass sheets onto shaping molds and unloading the bent sheets therefrom without adversely affecting the glass sheets.

It is another object of this invention to provide a new and useful apparatus for and method of automatically placing flat glass sheets simultaneously on shaping molds accurately, rapidly, smoothly and with the precision essential to meet production requirements in the automotive field.

It is still another object of the present invention to provide in the foregoing apparatus, a vertically reciprocal pick-up head having a novel glass gripping arrangement to readily and efficently remove superimposed glass sheets disposed in a horizontal plane from a conveyor system or a glass shaping mold.

It is yet another object of this invention to provide the foregoing pick-up head with novel means for pivoting an articulated gravity-type mold into an open position for receiving flat sheets of glass.

It is a further object of the present invention to provide means for accurately positioning and locking a mold on a conveyor system in vertical registry with the foregoing pick-up head arrangement.

It is still a further object of this invention to provide the foregoing material handling apparatus with means for self-aligning the pick-up head with an underlying mold.

The foregoing and other objects, advantages, and characterizing features of the present invention will become clearly apparent from the ensuing detailed description thereof, considered in conjunction with the accompanying drawings, wherein like reference characters denote like parts throughout the various views.

BRIEF DESCRIPTION OF THE DRAWINGS

FIG. 10 is a vertical sectional view, on an enlarged scale, taken on the line 10—10 of FIG. 7;

FIG. 11 is a fragmentary vertical sectional view, taken on the line 11—11 of FIG. 10;

FIG. 22 is an elevational view, partly in section and enlarged, taken along the line 22—22 of FIG. 21;

FIG. 23 is a horizontal sectional view, on an enlarged scale, taken along the line 23—23 of FIG. 22;

FIG. 24 is a plan view showing the mold locating pin and mold locating and locking mechanism in various operational positions;

DESCRIPTION OF THE PREFERRED EMBODIMENT

Figure 1:
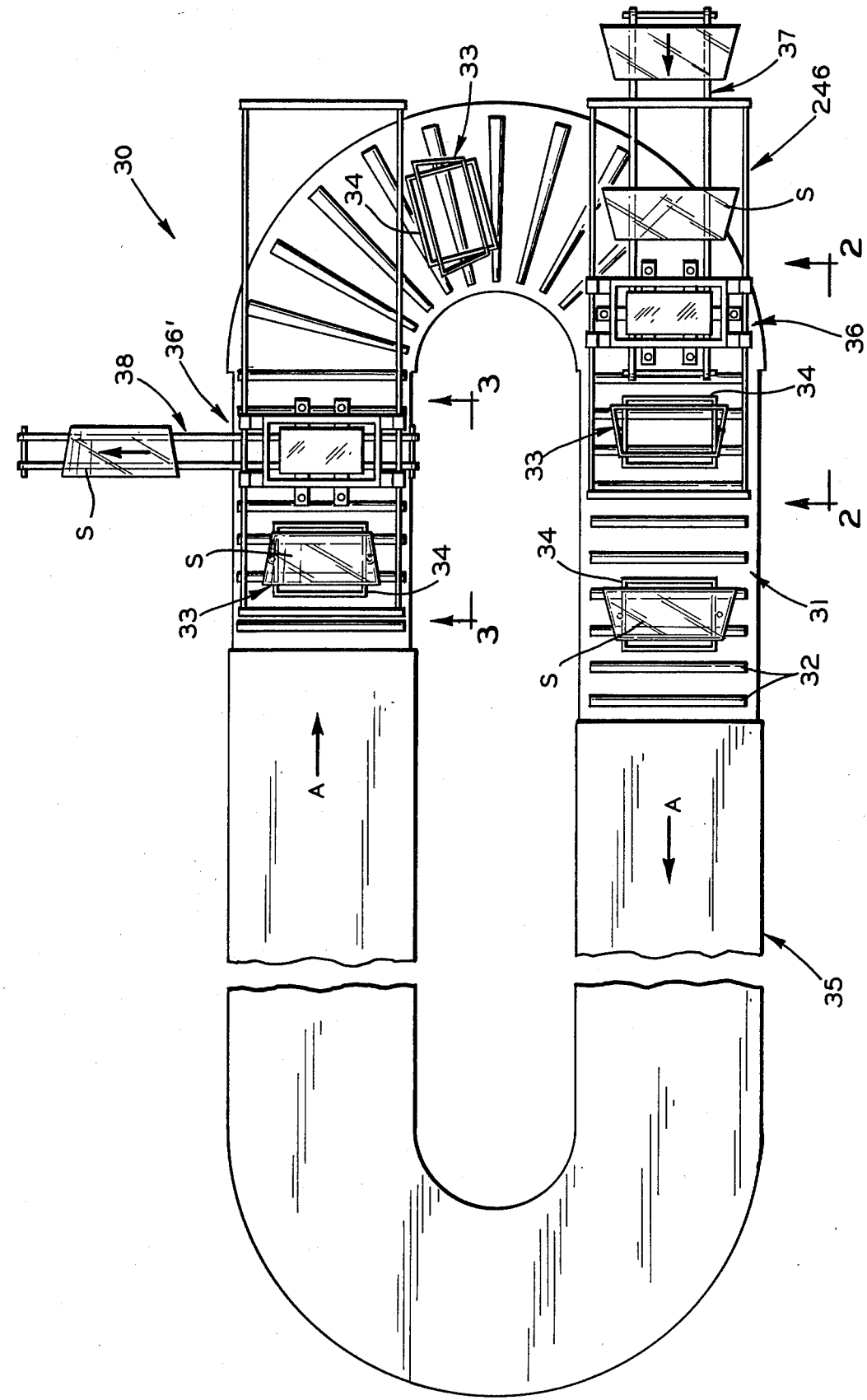
FIG. 1 is a schematic plan view of a glass fabricating production line and the mold loading and unloading stations associated therewith.

Referring now in detail to the illustrative embodiment depicted in the accompanying drawings, there is schematically shown in FIG. 1 a glass fabricating production line, comprehensively designated 30, which includes a continuous conveyor system 31 comprised of a series of power-driven, longitudinally spaced conveyor rolls 32 adapted to support a plurality of spaced glass-laden molds 33 for movement along a continuous, substantially horizontal, closed path through a conventional bending and annealing furnace 35, the molds 33 being continuously recycled along said path. As the glass sheets S are carried by the molds 33 through the heating chamber of the furnace 35, they are heated throughout to their softening or bending temperatures whereupon the sheets sag by gravity into conformity with the shaping surfaces of their respective molds 33. The bent sheets then pass through the annealing portion of furnace 35 whereat the temperature of the sheets is gradually reduced, as by streams of air for example.

In accordance with this invention, a mold loading apparatus, generally designated 36, is located upstream of the entry end of the furnace 35 for picking up the flat glass sheets S from an infeed conveyor 37 and depositing such sheets onto the molds 33. A mold unloading apparatus, generally designated 36' constructed similarly to apparatus 36 except for a few modifications that will hereinafter be described, is located downstream of the exit end of furnace 35. The mold unloading apparatus 36' is operative to remove the bent finished sheets from the molds 33 and transfer the same onto an outfeed conveyor 38 for further processing or storage. While the apparatus 36 and 36' are especially suited for handling paired superimposed sheets of glass, such as are utilized in the formation of automotive windshields for example, it should be understood that the mold loading and unloading apparatus of this invention is in no way restricted to such usage, but has utility in any material handling operation where it is desired to transfer a single or any number of stacked, relatively rigid, sheet-like articles from one location to another.

Referring now in detail to FIGS. 4–9 of the drawings, the mold loading apparatus 36 constructed in accordance with this invention comprises a carriage 40 formed of a suitable framework mounted for horizontal reciprocal movement on and relative to a structural frame 41, which includes two vertically extending columns 42 located at each side of the carriage and spaced longitudinally therealong with the columns on opposite sides of the carriage being laterally aligned. The columns 42 extend upwardly above the carriage 40 and are tied together at their upper ends by horizontally disposed beams 43 extending longitudinally and transversely of the carriage 40, respectively, and rigidly secured at their opposite ends to the columns 42 to form a rigid, box-like structure.

Inwardly extending support arms 45 are rigidly secured to the opposed columns 42 for supporting elongated structural members 46, in turn, supporting elongated guide rails 47. A pair of spaced bushing blocks 48 are mounted on each side of the carriage 40 and are suitably recessed to accommodate the guide rails 47 to guide the carriage 40 in its rectilinear path.

Figure 5:
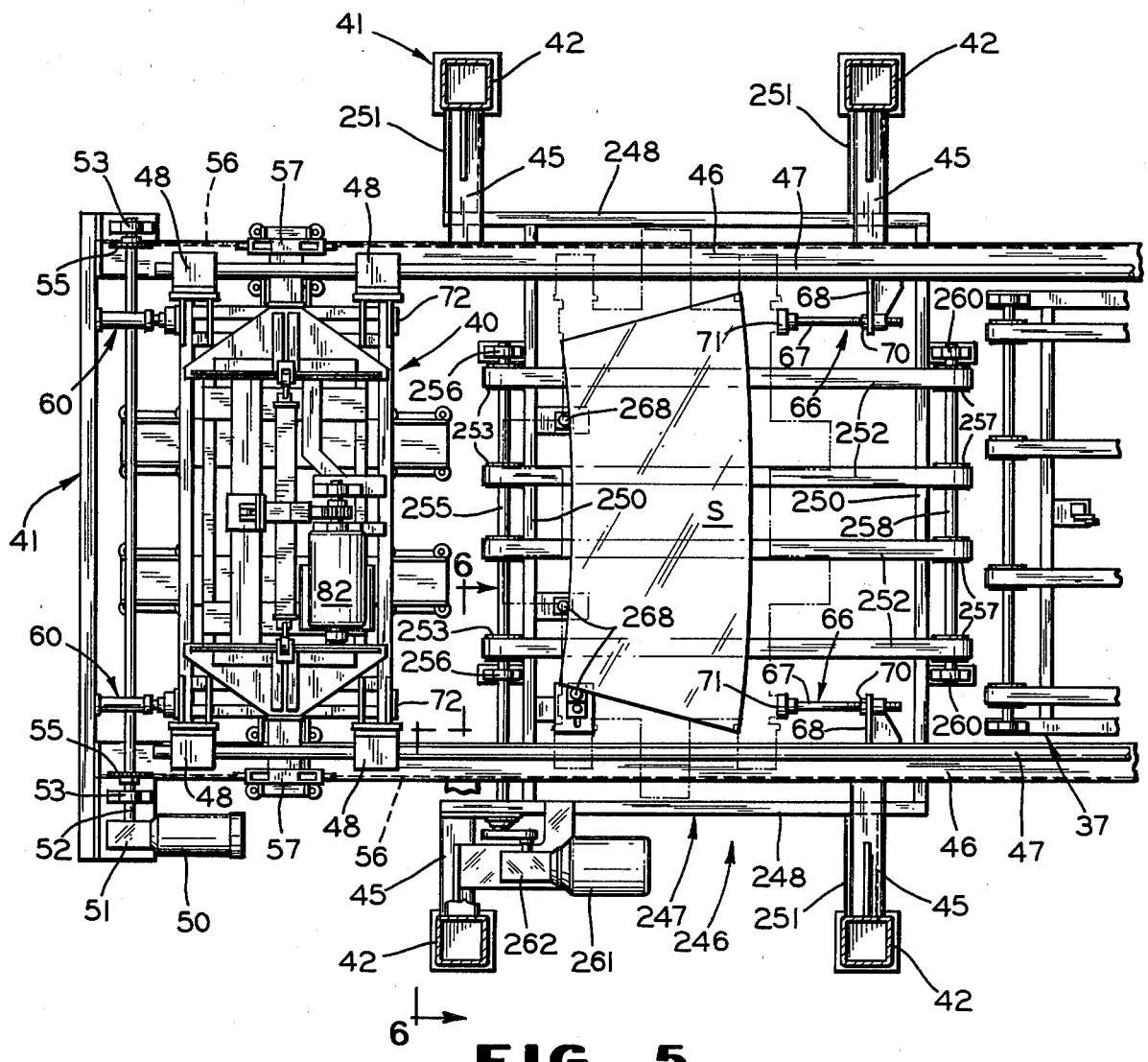
FIG. 5 is a fragmentary, top plan view of the apparatus shown in FIG. 4.
Figure 6:
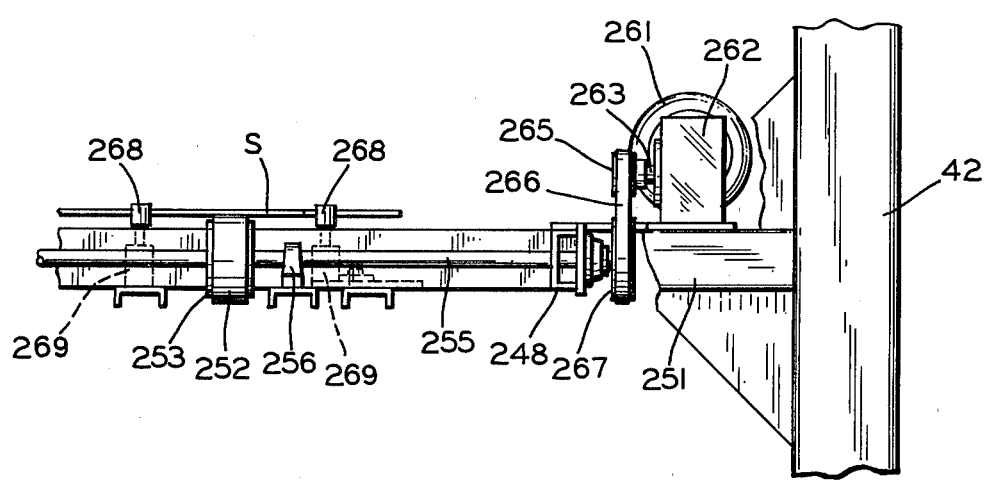
FIG. 6 is a vertical sectional view, on an enlarged scale, taken along line 6—6 of FIG. 5 and showing details of the glass infeed conveyor.

The means for reciprocating carriage 40 between the position shown in full lines in FIG. 5 and the position shown in phantom therein includes an electric motor 50 connected, via gear reduction mechanism 51, to a drive shaft 52 journalled for rotation in spaced bearing blocks 53 mounted on the frame 41. The shaft 52 is provided with a pair of axially spaced drive sprockets 55 for driving endless drive chains 56 which also are entrained about suitable idler sprockets (not shown). The drive chains 56 are anchored at their ends to mounting brackets 57 (FIG. 7) forming a part of the carriage 40. Each end of each drive chain 56 is provided with a threaded stud extending into a cutout section formed in the associated bracket 57 and secured therein by a locknut 58.

Figure 7:
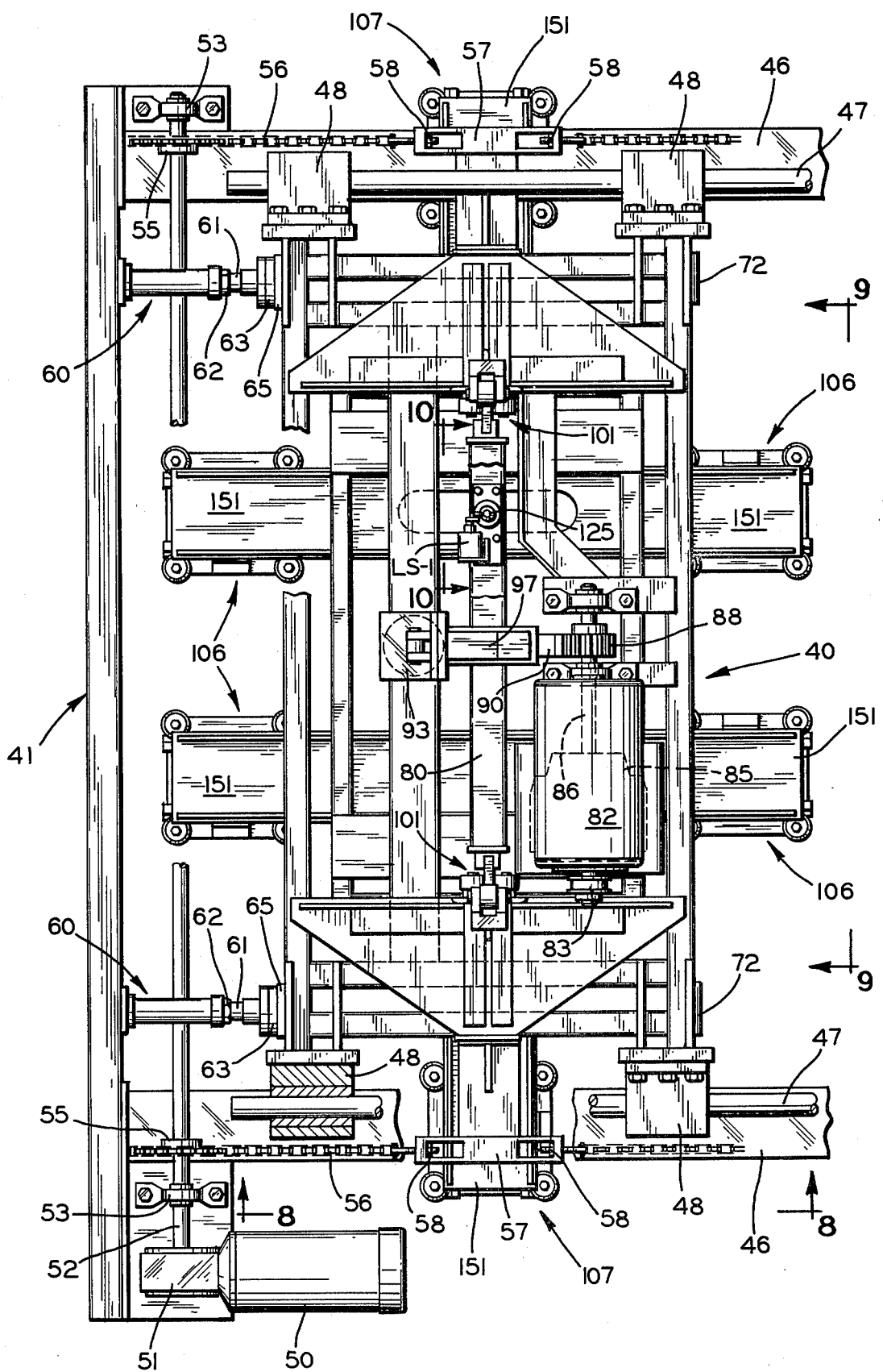
FIG. 7 is an enlarged plan view of the mold loading apparatus of this invention.

A pair of laterally spaced locating devices in the form of adjustable stops 60 are positioned in the path of movement of carriage 40 when shifted leftwardly as viewed in FIGS. 5 and 7 to accurately position the same in the desired location for depositing or loading the glass sheets onto an empty mold as will hereinafter be explained. Each of the stops 60 is formed of a threaded rod 61 extending through a suitable nut 62 and having a bumper pad 63 affixed to the distal end thereof. The pad 63 is adapted to engage an upright abutment member 65 forming a part of the carriage framework.

Also, a pair of laterally spaced adjustable stops 66 are positioned in the path of movement of carriage 40 when shifted to the right as viewed in FIG. 5 to position the carriage 40 in the desired location for picking up or removing the glass sheets from infeed conveyor 37 for subsequent transfer to a mold. Each of these stops 66 is formed of a threaded rod 67 extending through a mounting bracket 68 connected to structural member 46 and secured in the selected adjusted position by a locknut 70. The other end of rod 67 is provided with a bumper pad 71 adapted to engage an upright abutment 72 (FIG. 7) forming a part of the carriage framework.

In accordance with this invention, an elevator, generally designated 75, is mounted on the carriage 40 for vertical reciprocal movement relative thereto to remove glass sheets from the infeed conveyor 37 and ultimately deposit the same on an empty mold 33. The elevator 75 comprises a rigid frame 76 supporting at its lower end a pick-up head, generally designated 77. The frame 76 generally includes a pair of laterally spaced, vertically extending structural members 78 secured at their lower ends on mounting plates 79 affixed to a base member 74 in the form of a rectangular frame and interconnected at their upper and lower ends by cross members 80 and 81, respectively.

Figure 8:
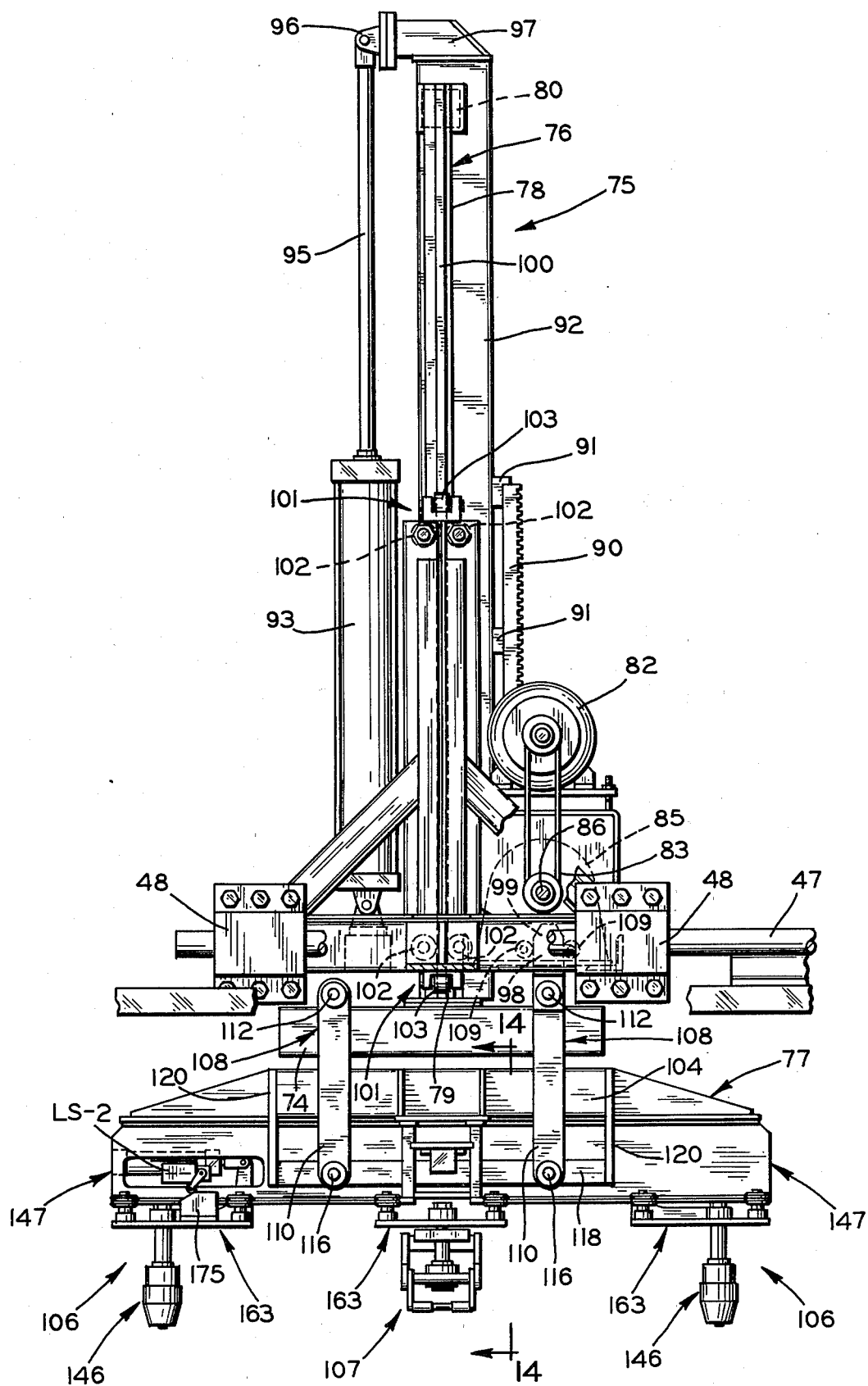
FIG. 8 is a side elevational view of the apparatus of FIG. 7, looking in the direction of arrows 8—8 of FIG. 7.
Figure 9:
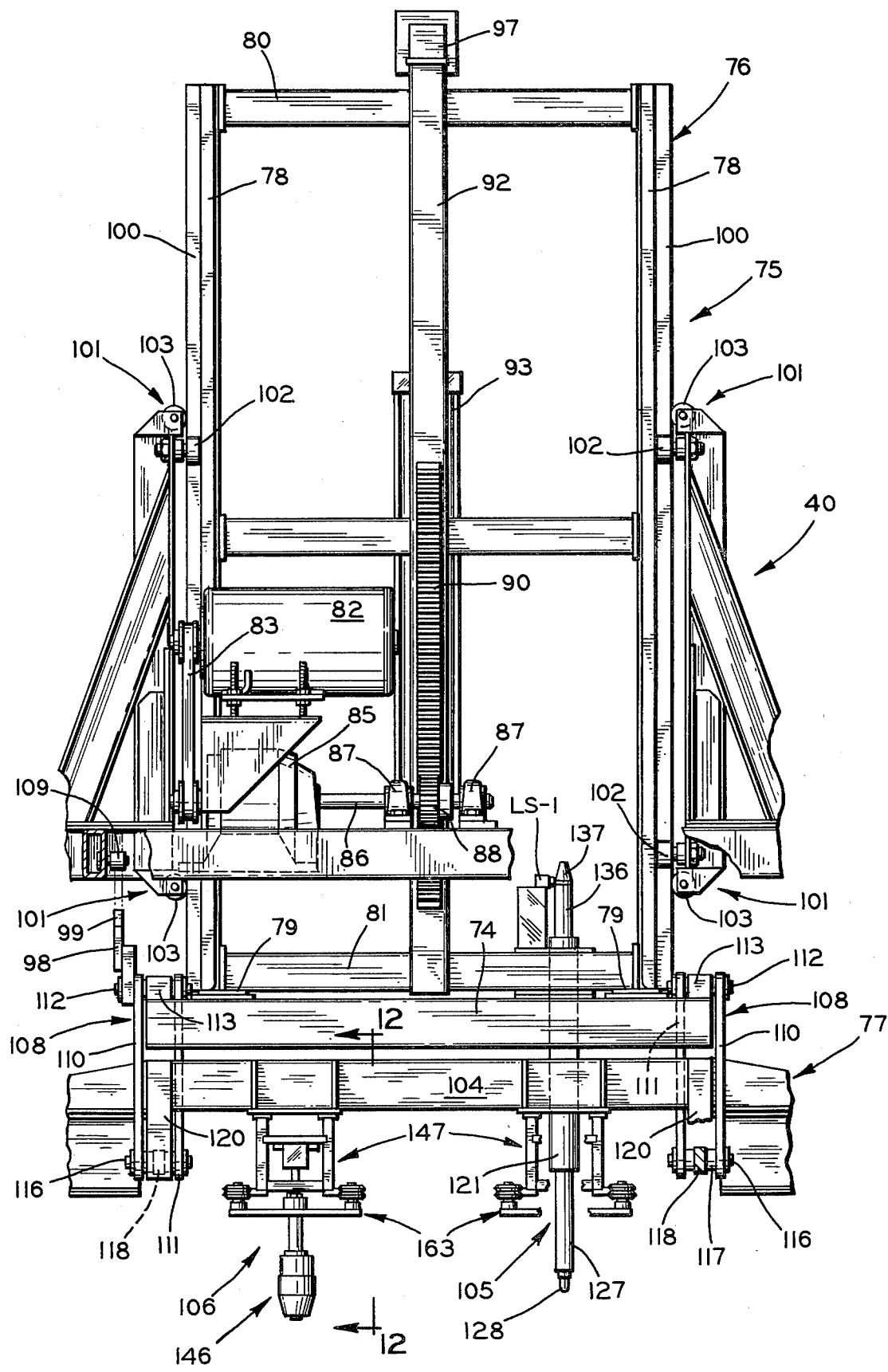
FIG. 9 is a front elevational view of the apparatus of FIG. 7, looking in the direction of arrows 9—9 of FIG. 7.

As best shown in FIGS. 8 and 9, the means for raising and lowering the elevator 75 includes an electric motor 82 mounted on the carriage frame and connected to a suitable source of electrical power (not shown). The motor 82 is operatively connected by means of a pulley and belt arrangement 83 to a gear reduction mechanism 85 mounted on the carriage frame. The gear reduction mechanism 85 is provided with a drive shaft 86 suitably journalled for rotation in spaced bearing blocks 87 mounted on the carriage 40. A pinion gear 88 is mounted on shaft 86 for meshing engagement with a gear rack 90 suitably secured, as by brackets 91, to a center post 92 forming a part of the elevator frame 76. Thus, rotation of the pinion gear 88 in either direction effects vertical upward or downward movement of the post 92 and thereby elevator 75. The distance of vertical travel of the elevator 75 can be regulated by adjustment of the various switches and motor controls in both the loading and unloading operations to accommodate different vertical levels of the infeed or outfeed conveyors and/or molds of varied depths.

A counterbalance cylinder 93 is mounted on the carriage 40 and is provided with the usual reciprocal piston (not shown) connected to a piston rod 95. The piston rod 95 is pivotally connected at its distal end to a lug 96 affixed to a horizontal arm 97 rigidly secured to the center post 92. The counterbalance cylinder 90 functions as a counterweight and, when loaded under pressure, serves to balance the weight of the elevator 75.

The means for guiding the elevator 75 in a true vertical path includes a pair of elongated tracks 100 secured to the structural members 78, respectively, each being guided for vertical sliding movement by vertically spaced roller assemblies 101 suitably mounted on the carriage 40. Each roller assembly 101 comprises a pair of opposed rollers 102 engageable against the opposite sides of track 100 and a third roller 103 engageable with the outer face of track 100. By this arrangement, true vertical movement of the elevator 75 is assured.

The pick-up head 77 is hingedly mounted on base member 74 and includes a generally rectangularly shaped frame 104 supporting a probe assembly 105, a plurality of article pick-up fingers or gripper assemblies 106, and a pair of mold cocking assemblies 107, all of which will be hereinafter described in detail. The means for hingedly mounting head 77 on base member 74 includes a pair of spaced link assemblies 108 (FIGS. 8 and 9) along each side of the pick-up head 77. Each link assembly 108 comprises a pair of links 110 and 111 mounted at their upper ends in spaced relation on a pivot pin 112 extending through a collar 113 affixed to the upper face of base member 74. The outer link 110 extends downwardly over the side face of base member 74 while the inner link 111 projects through open areas formed in base member 74 and the frame 104 of head 77.

The lower ends of the links 110 and 111 are mounted on a pivot pin 116 extending through a collar 117 affixed to a horizontal arm 118 rigidly secured at its opposite ends to the lower ends of vertical support brackets 120 (FIG. 8) attached to the frame 104. In the illustrative embodiment depicted in the drawings, preferably four such link assemblies 108 are utilized, two at each side of the head 77. This pivotal mounting arrangement of the pick-up head 77 provides sufficient play to allow limited freedom of longitudinal movement of the head 77 to render it self-aligning relative to the mold on which the glass sheets are to be deposited.

Means are provided for stabilizing the head 77 against such free swinging movement when in its uppermost position during traverse of the carriage 40. Such means include an extension 98 suitably mounted on the upper end of one of the links 110 and formed with an upper tapered end portion 99. As the ascending head 77 approaches the end of its upward travel, the extension 98 is guided between a pair of opposed rollers 109 suitably mounted on the structural frame of carriage 40. The rollers 109 restrain the extension 98 therebetween and thereby the head 77 against translatory movement as long as the head 77 remains in its upper position.

As best shown in FIGS. 10 and 11, the probe assembly 105 serves to sense the presence of a glass sheet for pick-up and comprises a sleeve 121 extending through and fixedly secured to cross-member 81 as by means of upper and lower mounting plates 122 and 123. The sleeve 121 extends downwardly through the open areas of base member 74 and frame 104 and projects downwardly past the latter. The sleeve 121 telescopically receives a plunger 125 having a central body portion 126 and a diametrically reduced, lower portion 127 terminating in a tip 128 adapted to engage the glass sheet to be transferred. The plunger portion 127 is guided for axial movement within a bushing 130 fixedly secured within the sleeve 121 by means of a lock ring 131. A helical spring 132 is disposed about plunger portion 127 between the inner annular end of bushing 130 and a washer 133 disposed against a shoulder 135 formed by the transition between the central body portion 126 and the reduced diameter portion 127 of plunger 125.

The other of upper diametrically reduced portion 136 of plunger 125 is formed with a tapered head 137 for a purpose hereinafter described. The plunger portion 136 is guided for axial movement within a bushing 138 fixedly secured in sleeve 121 by a lock ring 140. A collar 141 is attached to the upper plunger portion 136 and is adapted to seat on the upper axial end face of sleeve 121 to support the plunger 125 in its normal, glass disengaging position shown in full lines in FIGS. 10 and 11. A bracket 142 is mounted on plate 122 for supporting a limit switch LS-1 having an actuating arm 143 provided with a roller 145 adapted to engage the tapered head 137 of plunger 125. It will be apparent that as the elevator 75 moves downwardly to initiate operation of the glass pick-up and transfer cycle, the tip 128 of plunger 125 engages the sheet S, terminating downward movement of plunger 125 as the elevator 75 continues to descend. The resulting relative movement between switch LS-1 and the upper portion of the plunger 125 causes the roller 145 to ride along the cam surface of tapered head 137 to trip actuating arm 143 and condition a circuit controlling a glass detection arrangement that becomes operative when the elevator 75 reaches the end of its downstroke.

Figure 12:
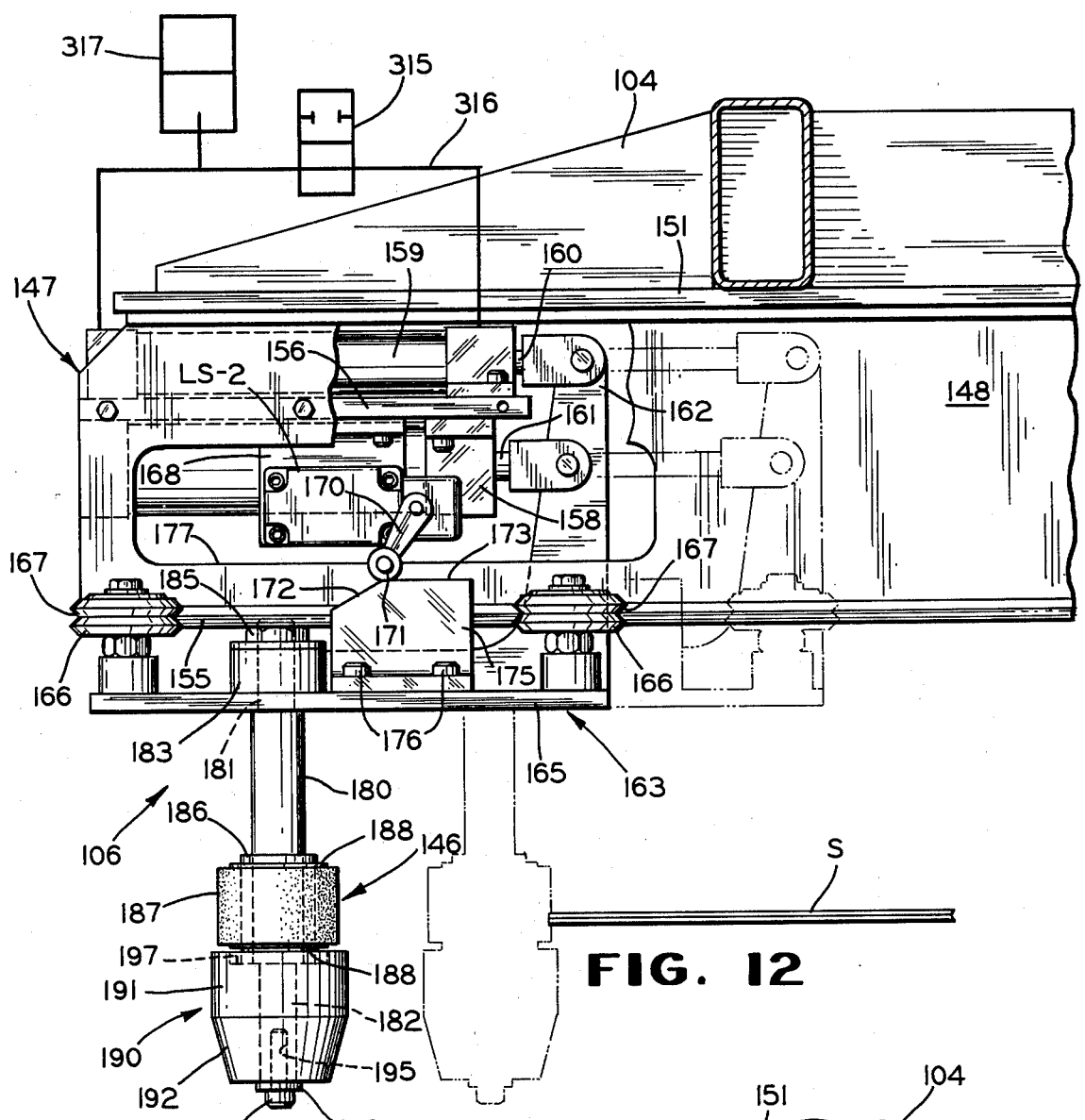
FIG. 12 is a vertical sectional view, on an enlarged scale, taken along the line 12—12 of FIG. 9, and partly diagrammatic, showing details of the glass engaging grippers and the actuators therefor.
Figure 13:
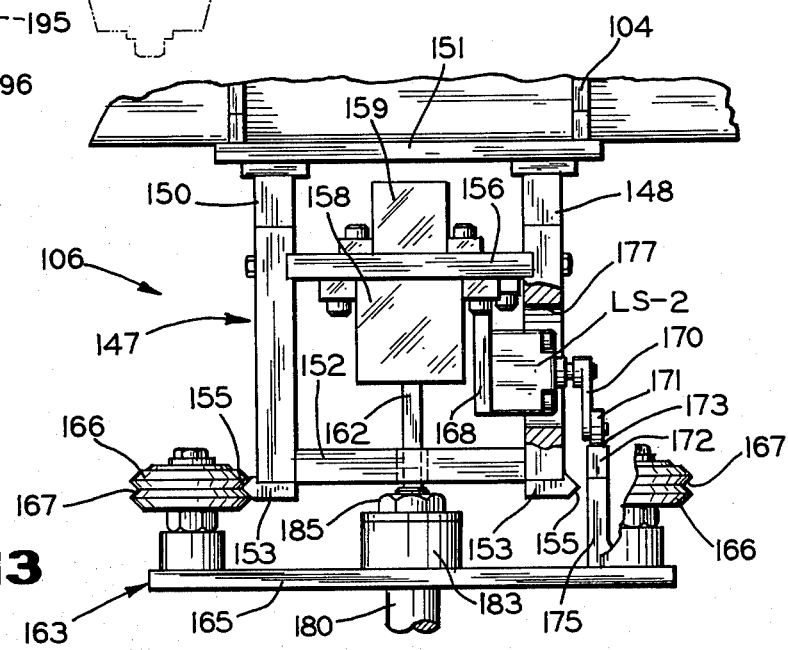
FIG. 13 is a enlarged, fragmentary front elevational view of the slide for carrying the gripper shown in FIG. 12.

As best shown in FIGS. 12 and 13, each gripper assembly 106 includes a glass engaging gripper unit 146 mounted on a structural frame 147 for horizontal movement relative thereto. The frame 147 includes a pair of laterally spaced, longitudinally extending structural members 148 and 150 depending downwardly from a mounting plate 151 rigidly secured to the frame 104 of head 77. These members 148 and 150 are maintained in their desired spaced-apart relation by cross member 152 and are provided at their lower ends with guide tracks 153 terminating in laterally outwardly directed tapered edges 155 for a purpose that will presently become apparent. A horizontally extending support plate 156 also is mounted between the structural members 148 and 150 intermediate plate 151 and cross member 152 for supporting a fluid cylinder 158. The piston rod 161 of cylinder 158 is attached to the upright portion 162 of a slide 163 for moving the latter longitudinally of the frame 147. The plate 156 also supports an hydraulic cylinder 159 having a piston rod 160 attached at its distal end to the upright portion 162 of slide 163, the function of cylinder 159 will be hereinafter described in detail in conjunction with the overall operation of mold loading apparatus 36.

The slide 163 also includes a base member 165 supporting, in addition to the gripper unit 146, a pair of longitudinally spaced rollers 166 on each side of the base member 165 laterally aligned with a pair of rollers 166 on the other side of the base member 165. These rollers 166 each are formed with peripheral V-shaped grooves 167 mating with the tapered edges 155 of guide tracks 153 to facilitate movement of slide 163 along the frame 147. A limit switch LS-2 is mounted on a bracket 168 affixed to plate 156 and is provided with an actuating arm 170 carrying a roller 171 adapted to ride on the inclined and horizontal cam surfaces 172 and 173 of a switch actuating block 175 secured to the base member 165 by suitable fasteners 176. Switch LS-2 is located within a cut-out section 177 of structural member 148 and generates a signal for a purpose hereinafter described.

Each gripper unit 146 comprises a vertically extending shaft 180 having an upper reduced diameter portion 181 and a lower reduced diameter portion 182. The upper portion 181 extends through the slide base member 165 and a boss 183 formed integral with base member 165. The shaft portion 181 is threaded for receiving a nut 185 securing the shaft 180 to the base member 165. The shaft 180 extends through a bushing 186 on which is mounted a freely rotatable disc-shaped gripper element 187 adapted to engage a marginal edge portion of a sheet or sheets to be gripped and preferably is formed of rubber or any other suitable resiliently yieldable material. The element 187 is fixed on the bushing 186 in its axial position by means of a pair of lock rings 188 attached to the bushing 186 at the opposite ends of the element 187. However, the bushing 186 is free to move vertically on the shaft 180, thus mounting the gripper element 187 for free vertical movement on shaft 180.

The lower reduced diameter portion 182 of the shaft receives a metallic cam element 190, preferably formed of metal or any other rigid material, having a cylindrical body portion 191 and a tapered end portion 192 adapted to engage the opposite side portions of the mold 33 (i.e., forward and rearward portions relative to the direction of mold travel) and, if necessary, shift the pick-up head 77 slightly for proper alignment with the mold prior to depositing the glass sheets thereon. The cam element 190 is fixed onto the shaft by means of a cap screw 193 threaded into a tapped bore 195 formed in the shaft portion 182. The head of the cap screw 193 engages a thrust washer 196 disposed about the shank of screw 193 in abutting engagement against the end face of shaft portion 182. A recess 197 is formed in the upper end of cam element 190 for receiving the bushing 186 and limiting downward movement thereof relative to shaft 180. Thus, the gripper element 187 and cam element 190 are suspended from slide 163 for horizontal movement therewith, the gripper element 187 being freely movable on shaft 180 while the cam element 190 remains fixed in place thereon. It should also be appreciated that the diameter of the gripper element 187 is slightly less than the diameter of the cam element 190 in order to establish the desired glass overhang at opposite sides of the mold for proper glass positioning on the mold.

Figure 14:
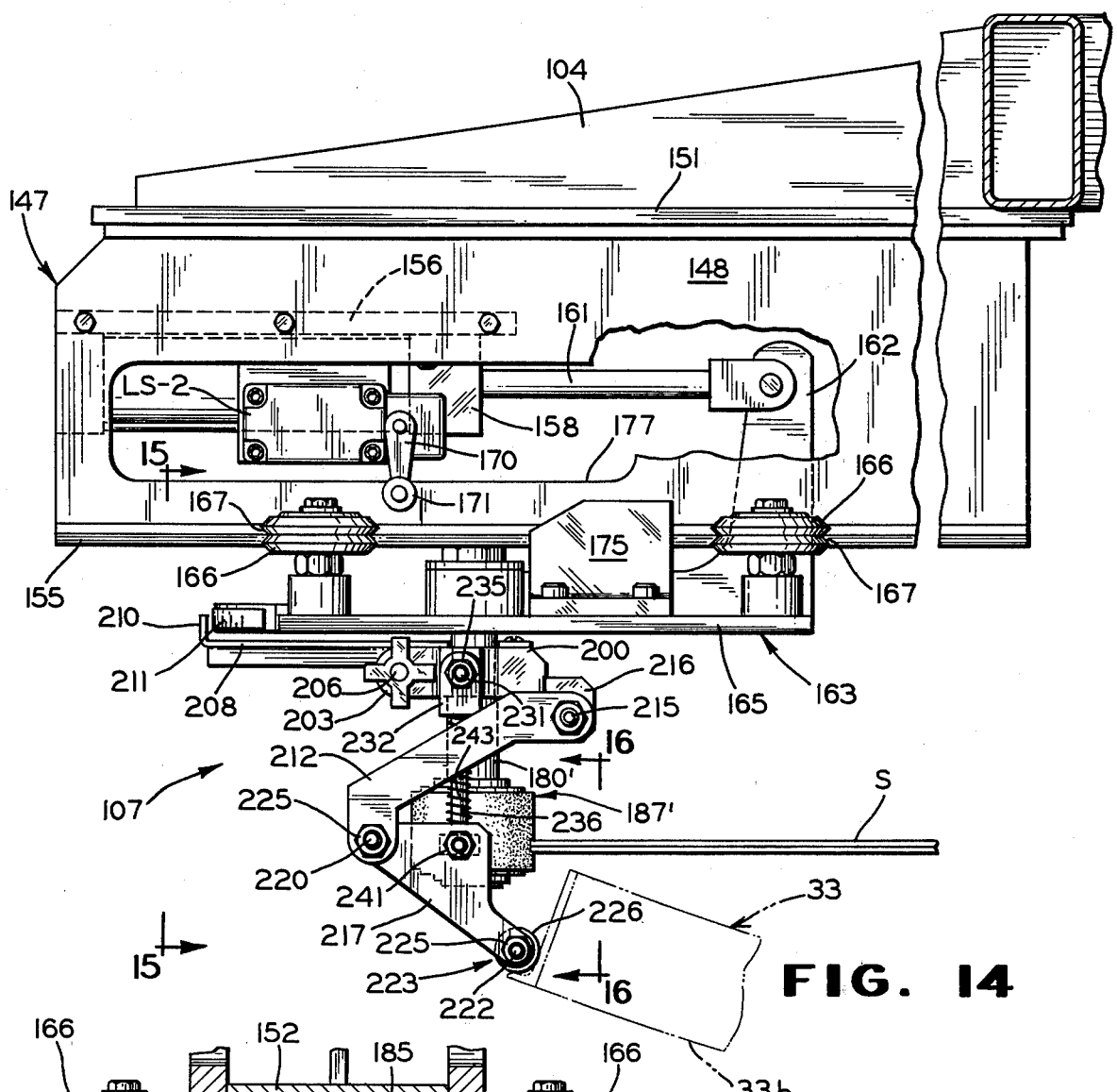
FIG. 14 is an enlarged front elevational view, partly in section, taken along the line 14—14 of FIG. 8 and showing details of the mold cocking mechanism.
Figures 15, 16:
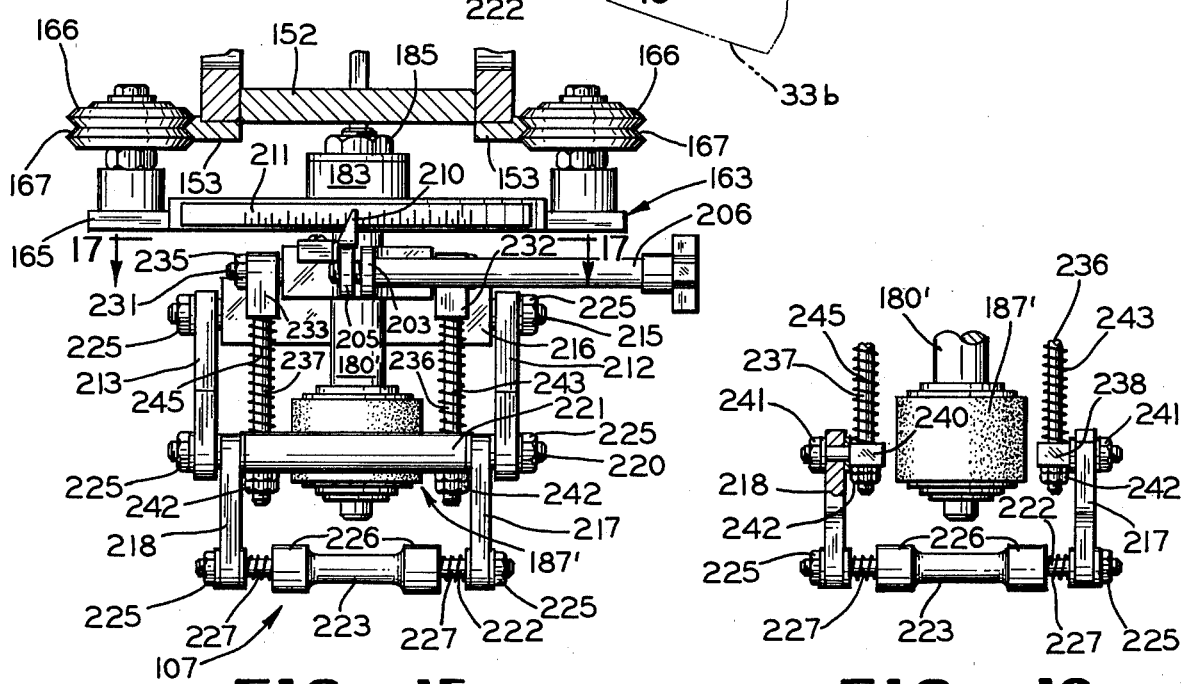
FIG. 15 is a side elevational view, partly in section, taken along the line 15—15 of FIG. 14.
FIG. 16 is a fragmentary side elevational view, looking in the direction of arrows 16—16 of FIG. 14.
Figure 17:
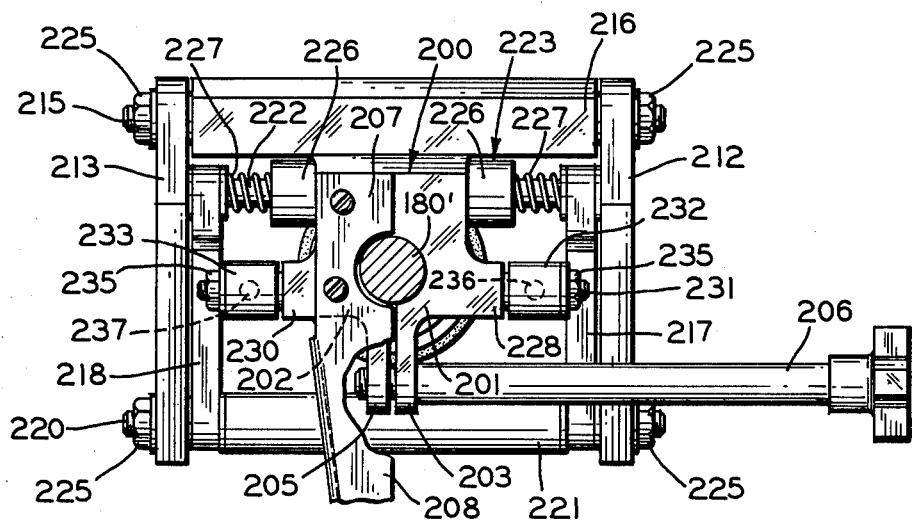
FIG. 17 is a horizontal sectional view, on an enlarged scale, taken along the line 17—17 of FIG. 15.

It should be realized that the gravity type molds 33 employed to carry the glass sheets through furnace 35 and effect the shaping thereof are the type that are hingedly mounted on rigid frames 34 (FIG. 14) and have articulated end sections 33a and 33b which are collapsible from a glass receiving or "open" position to a glass shaping or "closed" position. The mold 33 must be in an open position to receive the flat glass sheets, which then maintain the mold open until the glass becomes heat softened and allows the mold to collapse into its biased closed position to impart the desired final shape to the glass sheets. Since the molds 33 are recycled after the bent glass sheets are removed therefrom in the closed system shown in FIG. 1 and remain in a collapsed or closed condition, means are incorporated in the pick-up head 77 to pivot the mold sections 33a and 33b into a mold "open" position and maintain the mold in such open position until the flat glass sheets are deposited thereon. Such means constitute the mold cocking assemblies 107 located at the opposite ends of the pick-up head 77.

As best shown in FIGS. 14–19, each cocking assembly 107 includes a gripper element 187' mounted on a shaft 180' carried by a slide 163 in the same manner as gripper element 187. However, the cam element 190 described in connection with FIG. 12 is not necessary because the mold frame 34 is properly aligned or centered relative to the conveyor 31 by means of the cocking assembly 107 as will presently become apparent. The cocking assembly 107 comprises a split mounting bracket 200 disposed about shaft 180' and formed at one end with split portions 201 and 202 provided with extensions 203 and 205 having tapped openings therein. An elongated screw 206 is threaded through the opening of extensions 203 and 205 for tightening or loosening the split portions 201 and 202 about shaft 180'. This arrangement permits angular adjustment of the mold cocking assembly 107 about shaft 180' as dictated by the orientation of the transverse edges of the glass sheets being handled. A plate 207 is fastened onto the upper face of mounting bracket 200 and is formed with an elongated marker 208 having a pointer 210 referenced to a scale 211 suitably attached to the slide 163 to provide a visual indication of the adjustment desired.

A pair of laterally spaced links 212 and 213 (FIGS. 14 and 15) are pivotally mounted at their one ends, as by means of a pivot pin 215, to a bored extension 216 forming a part of the mounting bracket 200. The other ends of the links 212 and 213 are pivotally attached to one side of another pair of laterally spaced links 217 and 218 by means of a pivot pin 220 extending through a sleeve 221. The other ends of links 217 and 218 are connected together by a pin 222 supporting a mold engaging element 223. Suitable washers and nuts 225 are threaded onto the outer ends of the several pins 215, 220 and 222 to secure the assembly together. The element 223 is in the form of an elongated cylinder having enlarged diameter end portions 226 adapted to engage an end section 33a, 33b of mold 33 to swing the same into an open glass receiving position. Springs 227 are mounted on the pin 222 between the enlarged diameter end portions 226 and the associated links to maintain the element 223 centered while permitting some lateral movement thereof.

The split portions 201 and 202 of mounting bracket 200 are formed with laterally extending bosses 228 and 230 for supporting a pivot pin 231 therein. A pair of lugs 232 and 233 are pivotally mounted on the pin 231, as by nuts 235, and are provided with vertically extending rods 236 and 237 projecting through lugs 238 and 240 extending inwardly of and attached to the links 217 and 218 by nuts 241. Nuts 242 are threaded onto the lower ends of rods 236 and 237 to secure the same to lugs 238 and 240 while permitting limited axial movement of the rods relative to their associated lugs. Springs 243 and 245 are disposed about the rods 236 and 237 to normally urge the links 217 and 218 downwardly away from the links 212 and 213.

Figure 2:
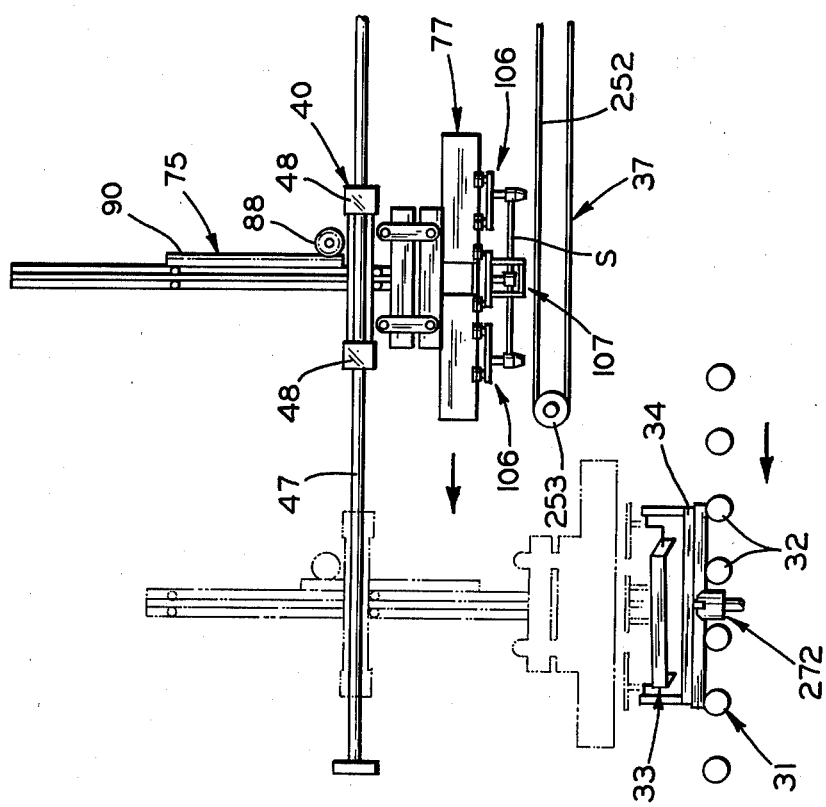
FIG. 2 is a schematic side elevational view of the apparatus for loading flat glass sheets onto a bending mold, looking in the direction of arrows 2—2 of FIG. 1.
Figure 4:
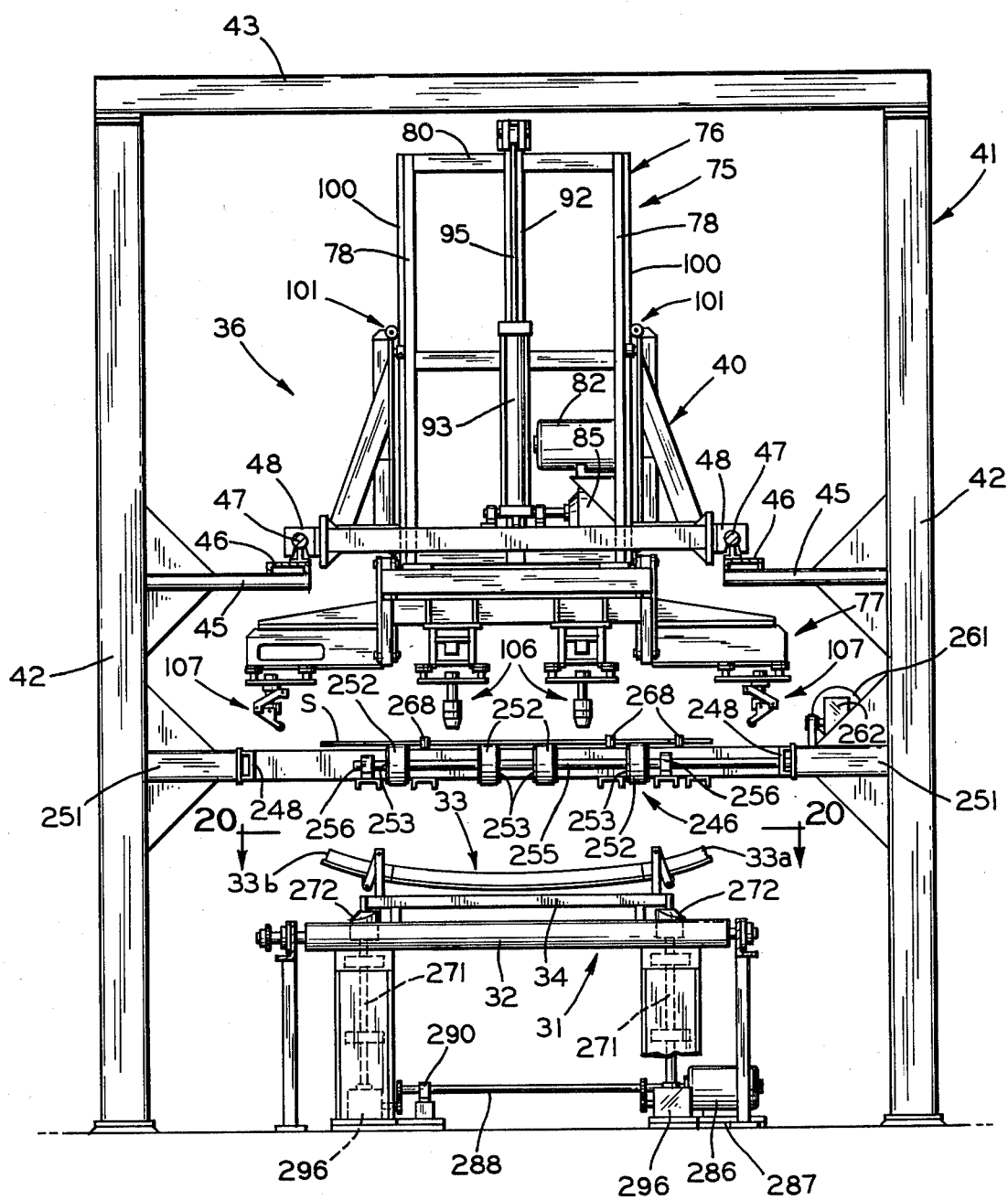
FIG. 4 is a rear elevational view of the mold loading apparatus constructed in accordance with this invention, showing the glass infeed conveyor and furnace conveyor associated therewith.

Referring now to FIGS. 1, 2, 4, 5 and 6 of the drawings, the infeed conveyor 37 is employed to feed longitudinally spaced, paired sheets of glass S one atop the other into the loading station. As shown in FIGS. 2 and 4, the infeed conveyor 37 is located above the conveyor system 31 in vertically spaced relation thereto and terminates in the region of the loading station. The infeed conveyor 37 comprises an unloading section 246 forming a continuation of the conveyor 37 for receiving paired sheets of glass therefrom and generally positioning the same for removal by the pick-up head 77. Conveyor section 246 is suitably mounted on a frame structure 247 (FIG. 5) including longitudinally extending structural members 248 and cross members 250, the members 248 being rigidly secured to support arms 251 extending inwardly from the columns 42 of frame 41. The conveyor section 246 includes a plurality of laterally spaced endless belts 252 passing over and driven by drive pulleys 253 located at one end of the conveyor section 246 and mounted on a drive shaft 255 journalled for rotation in spaced bearing blocks 256. The belts 252 also are entrained about idler pulleys 257 mounted on an idler shaft 258 at the opposite end of the conveyor and suitably journalled for rotation in spaced bearing blocks 260. The means for driving conveyor belts 252 includes an electric motor 261 connected, via gear reducer 262, to an output shaft 263 having a drive pulley 265 mounted thereon. The drive belt 266 is entrained about drive pulley 265 and a driven pulley 267 mounted on the drive shaft 255.

A pair of laterally spaced locator stops 268 are positioned in the path of movement of the advancing superimposed glass sheets to interrupt movement thereof and position the same in the desired location relative to the overlying pick-up head 77. Each stop 268 is secured to the distal end of a piston rod of a fluid cylinder 269 (FIG. 6) mounted on the conveyor frame. The cylinders 269 are operative to raise and lower the stops 268 between an upper position above conveyor belts 252 in the path of movement of the glass sheets S and a lower position therebeneath. The cylinders 269 can be mounted on suitable slides or tracks to adjust their positions on the infeed conveyor frame to accommodate a wide variety of sheet sizes and shapes.

As the paired glass sheets S are transferred onto the conveyor section 246, a photoelectric cell or other suitable detection device (not shown) activates a timer controlling the operation of the motor 261 to reduce the speed of conveyor belts 252 and stop movement thereof after the sheets are up against the stops 268. The sheets are thereby properly positioned for pick-up by the overlying head 77.

The mold loading apparatus 36 of this invention is operative to remove the sheets from the infeed conveyor 37 and transfer the same onto an empty mold 33 as will hereinafter be more fully explained. When transferring the paired glass sheets from the head 77 onto an empty mold 33, it is important that the head 77 and mold 33 be accurately aligned. To this end, a pair of mold locators, generally designated 270 (FIGS. 20-24), are provided for precisely locating an empty mold 33 on the conveyor system 31 at the loading station. Each of the mold locators 270 includes a vertically extending, rotatable shaft 271 surmounted at its upper end by a locking head 272 and operatively connected at its lower end to a power train hereinafter described in detail. The locking head 272 is formed with a generally cylindrical body 273 provided with a U-shaped slot 275 defined by a sidewall 276 having a bight portion and leg portions extending in a divergent relation from said bight portion. The upper edge 277 of the wall 276 is substantially flat and then tapers downwardly, as at 278, to merge with the outer cylindrical surface of the body 273. The bottom wall 280 of the slot 275 slopes downwardly from the back portion of wall 276 outwardly to the cylindrical surface of body 273. These tapering and sloping surfaces 278 and 280 facilitate the shedding of any cullet generated by broken glass. The slots 275 of the two locking heads 272 are adapted to receive the spaced apart pins 279 forming a part of the mold supporting frame 34 and extending downwardly therefrom to accurately position and maintain the mold 33 in registry with head 77 during the mold loading operation.

The means for supporting the shaft 271 includes a base 281 provided with a pair of spaced, upright structural members 282 rigidly secured along their upper portions to a flat, vertical plate 283. The plate 283 supports a pair of vertically spaced bearing blocks 285 through which shaft 271 is journalled for rotation.

The power train for rotating the heads 272 in unison in opposite directions includes an electric motor 286 suitably mounted on a support block 287 and having an elongated output shaft 288 (FIG. 20) suitably journalled for rotation in spaced bearing blocks 290. A pair of longitudinally spaced drive sprockets 291 are mounted on shaft 288, each having a drive chain 292 entrained thereabout and about a driven sprocket 293 mounted on a shaft 295. Each shaft 295, in turn, is operatively connected, via gear reduction mechanism 296, to the associated shaft 271 for rotating the same.

A pair of limit switches LS-3 and LS-4 for controlling operation of the locators 270 and a section of the conveyor system 31 located at the loading station, respectively, are mounted on angle brackets 297 and 298 rigidly secured to the plate 283. These switches are provided with spring loaded plungers 300 and 301 having rollers 302 and 303 mounted on the distal ends thereof. These rollers ride on the annular cam surfaces 305 and 306 of a pair of vertically spaced, disc cams 307 and 308 rigidly secured on shaft 271 for rotation therewith. The cam surfaces 305 and 306 have arcuately shaped depressions 310, 311, 312 and 313, respectively, for actuating the switch plungers to control certain operations as will hereinafter be explained in describing the operation of apparatus 36.

The mode of operation of the mold loading apparatus 36 of this invention is as follows:

With the carriage 40 disposed at the pick-up station shown in phantom in FIG. 5 against the bumper pads 71 of stops 66 and elevator 75 in an intermediate "dwell position" above conveyor 75, a pair of superimposed sheets of glass S are delivered from the infeed conveyor 37 onto the conveyor section 246. As the paired sheets enter onto the conveyor section 246, a suitable detection device (not shown) actuates a timer (also not shown) controlling the speed of motor 261 to decrease the speed of conveyor belts 252. The paired sheets of glass are advanced against the stops 268 to accurately position the sheets relative to the overlying pick-up head 77. When the timer times out, the motor 261 stops to halt the conveyor belts 252 and to initiate activation of the motor 80 to lower the elevator 75.

As the elevator 75 approaches the end of its downstroke, the tip 128 of probe 127 engages the glass on conveyor section 246 and remains stationary while the elevator continues to move downwardly. This relative movement trips the actuating arm 143 of switch LS-1, conditioning a circuit controlling a suitable glass detection device (not shown) that becomes operative when the elevator 75 reaches the end of its downward travel. In the absence of glass, the probe 127 continues to move downwardly along with the elevator 75 and consequently does not actuate switch LS-1. If the detection device senses glass when the elevator 75 is fully down, subsequent gripper operations are allowed to occur. If glass is not sensed, subsequent operation of the gripper assemblies 106 is negated and the elevator returns immediately to its upper position in readiness for the next glass pick-up operation.

When the elevator 75 reaches its downstroke, and assuming that glass has been detected, the gripper units 146 are actuated in sequence. The gripper elements 187 will have been lowered into the plane of the glass sheets with the lower portions of elements 187 disposed below the active runs of conveyor belts 252 in the lateral spaces therebetween. The pair of gripper units 146 at the side of pick-up head 77 remote from the stops 268, as well as one of the end grippers 187', are actuated first (such grippers hereinafter referred to as the "primary grippers"). Their cylinders 158 are actuated to extend the piston rods 161 and slides 163 for positioning the primary grippers against one side edge and one end edge of the glass sheets to hold the sheets against the stops. A pressure responsive switch (not shown) in the fluid supply line to the primary gripper cylinders 158 detects the rise in pressure in such cylinders when the glass sheets are held against the stops 268.

Upon the attainment of a predetermined pressure acting in cylinder 158, the pressure switch actuates a valve 315 (FIG. 12) located in the hydraulic line 316 of a closed system connecting the rod end of the cylinder 159 to the head end thereof. An accumulator 317 also is tapped into hydraulic line 316 to maintain the system charged. As the pressurized cylinder 158 became operative to extend the piston rod 161 and thereby slide 163, the rod 160 of cylinder 159 also was extended by virtue of its attachment to the upright portion 162 of slide 163. This caused the hydraulic fluid in cylinder 159 to flow from the rod end of cylinder 159 to the head end thereof. The valve 315, when actuated by the pressure responsive switch, closes to trap or lock the hydraulic fluid in the head end of cylinder 159 and thereby fixes the position of the primary grippers and the glass sheets relative to head 77. This arrangement not only prevents the secondary gripper units from overpowering the primary gripper units which are in direct opposite relation to each other, but also permits the use of longer stroke cylinders to accommodate a wide range of glass sizes. After the primary gripper units are fully extended, the remaining or "secondary" gripper units are actuated to engage the opposite sides of the glass sheets and urge the same against the primary grippers to securely grip or clamp the glass sheets therebetween.

With the glass sheets securely gripped, the elevator 75 starts up (full lines in FIG. 2) until it reaches its upper level, causing the motor 82 to stop and initiating movement, via motor 50 and the associated drive, of the carriage 40 toward the mold loading position or to the left as viewed in FIG. 5. As the carriage 40 approaches the end of its travel, a signal is generated reducing the speed of the carriage drive to a low level, allowing the motor 50 to stall when the carriage reaches the end of its travel against the bumper pads 63 of locator stops 60. This, in turn, generates another signal starting motor 82 to lower the elevator 75 until it reaches an intermediate dwell position. In the event that mold 33 has not been locked in position, as will presently be described, the elevator 75 is stopped in this dwell position until a "mold locked" signal is generated.

Referring now to FIGS. 20-24 illustrating the mold locating-locking mechanism, it will be seen that as an empty mold 33 advancing on conveyor rolls 32 reaches the mold locators 270, the spaced pins 279 affixed to the mold frame 34 are received in slots 275 of locking heads 272. These pins 279 are very precisely located in a spaced-apart relation to accurately engage the slots 275 of the locking heads 272. While different sized molds can be utilized with the subject apparatus, the spacing of the pins 279 mounted thereon remains constant. A suitable detection device, forming a part of the electrical control system for the conveyor system 31, generates a signal indicating the presence of the mold 33 at the locators 270 and also stopping the conveyor section at the mold locating station. This signal also energizes the motor 286 for rotating shaft 271 and the associated locking heads 272 affixed thereto. As the control shaft 271 rotates in a counterclockwise direction as shown in FIG. 23, the cams 307 and 308 rotate therewith as the rollers 302 and 303 of limit switches LS-3 and LS-4 ride on cam surfaces 305 and 306, respectively. Rotation of the cams continue until the roller 302 enters the depression 311 to actuate switch LS-3 and deenergize the motor 286, causing the rotary movement of shafts 271 to stop. This locates the slots 275 of locking heads 272 in the position shown in the central view of FIG. 24, locking the mold 33 in place on the conveyor section. This condition also generates the "mold lock" signal hereinbefore mentioned, allowing the elevator 75 to continue its descent, as shown in phantom in FIG. 2.

Figure 26:
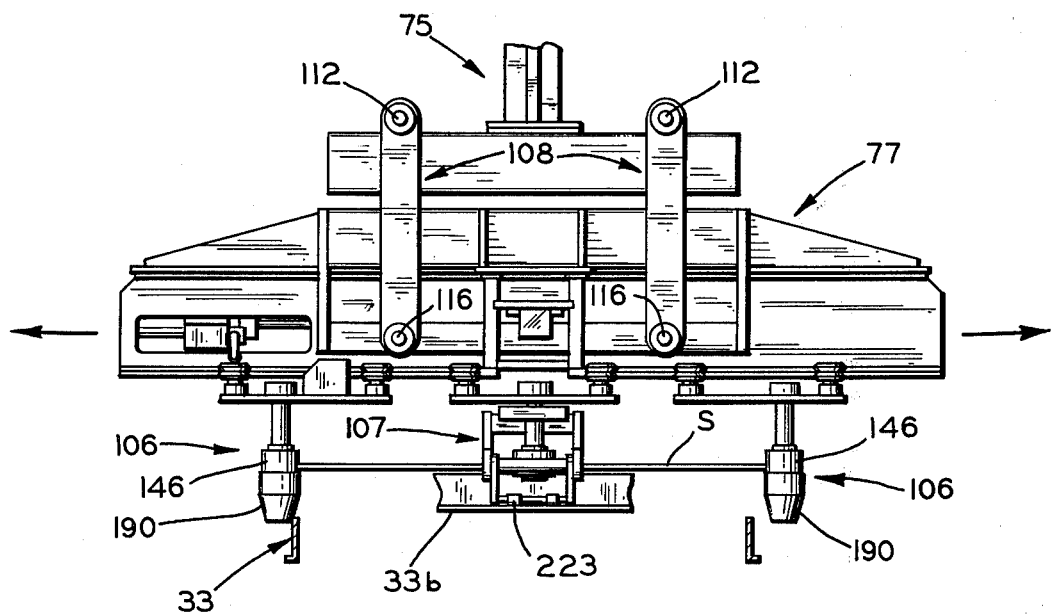
FIG. 26 is a schematic side elevational view of the mold loading apparatus, showing the lateral movement capability of the pick-up head thereof.

Means are provided to self-align the pick-up head 77 with the mold 33 in the event there is slight vertical misalignment therebetween. Should there be misalignment in the longitudinal direction, the descending cam elements 190 associated with the gripper units 146 will engage the side portions of the mold (FIG. 26) to shift the head 77 slightly into vertical registry with the mold 33, such swinging movement being permitted by the pivotal linkage mounting of head 77 on frame 104. Any misalignment in the lateral direction will be corrected by the engagement of the descending cocking assemblies 107 with the end portions 33a,33b of the mold 33 to shift the same bodily relative to its frame 34. The hingedly mounted arrangement 34a of the mold 33 on frame 34 permits such limited movement. Thus, the pivotal mounting of pick-up head 77 on elevator frame 104 and the pivotal mounting of mold 33 on its frame 34 renders the head and mold self-aligning to correct any slight misalignment therebetween.

Figure 18:
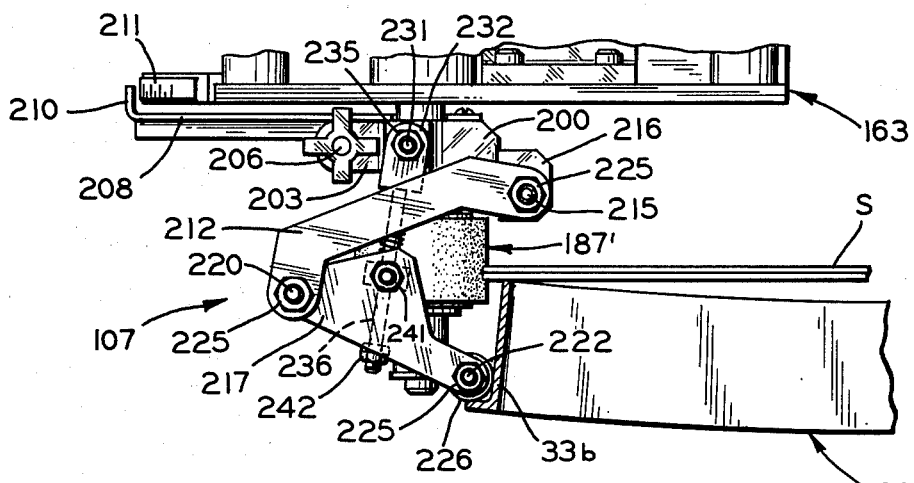
FIGS. 18 and 19 are fragmentary front and rear elevational views, respectively, partly in section, of the mold cocking mechanism.
Figure 19:
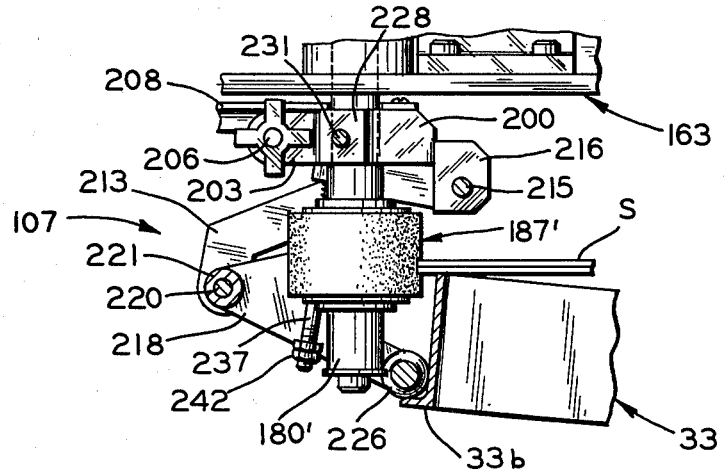
Figure 20:
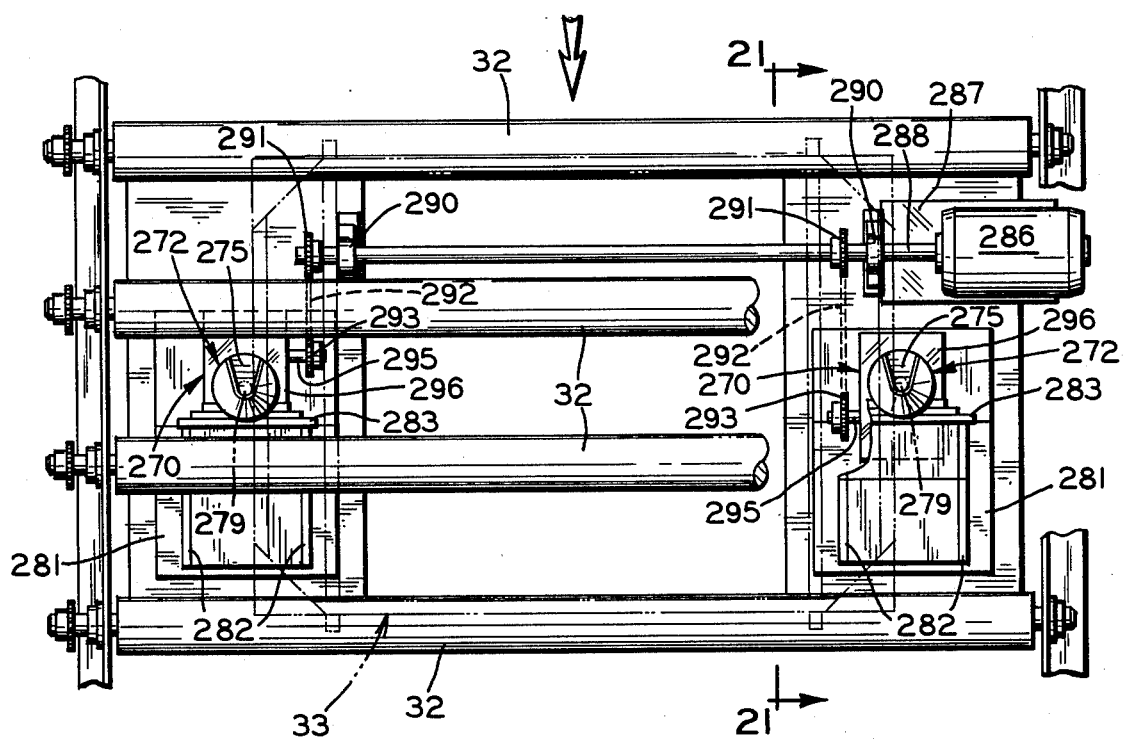
FIG. 20 is a top plan view, looking in the direction of arrows 20—20 of FIG. 4, on an enlarged scale and showing the mold locating and locking mechanism.
Figure 21:
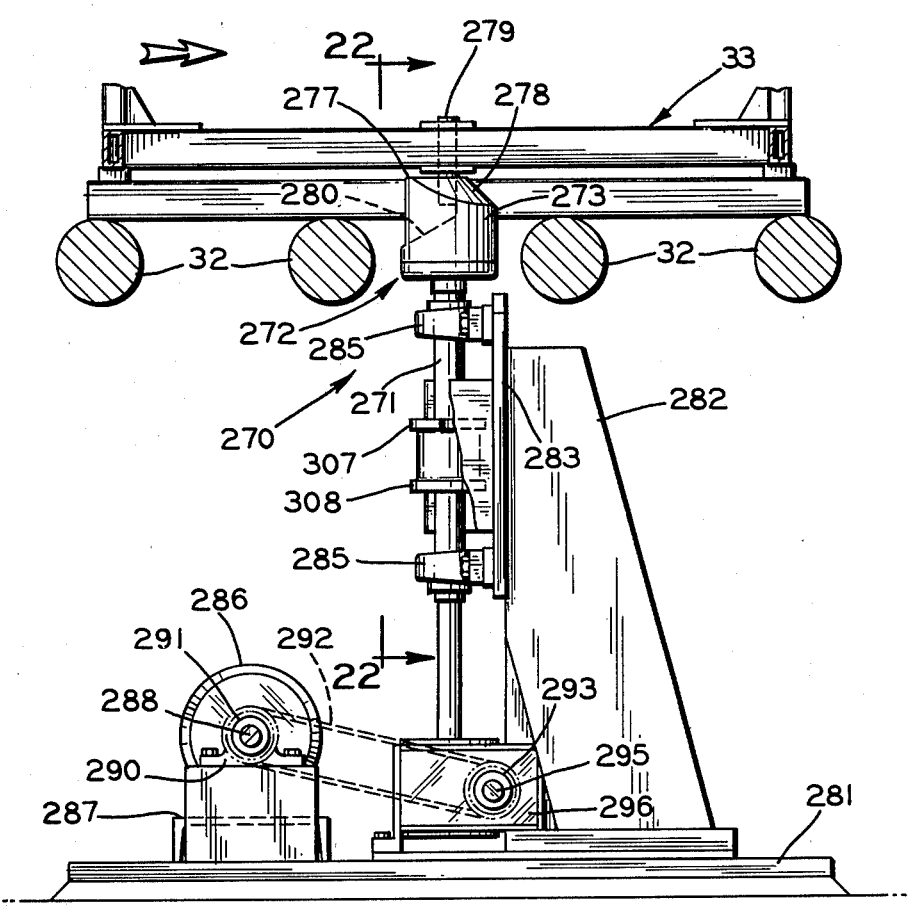
FIG. 21 is a vertical sectional view, on an enlarged scale, taken along the line 21—21 of FIG. 20.
Figure 25:
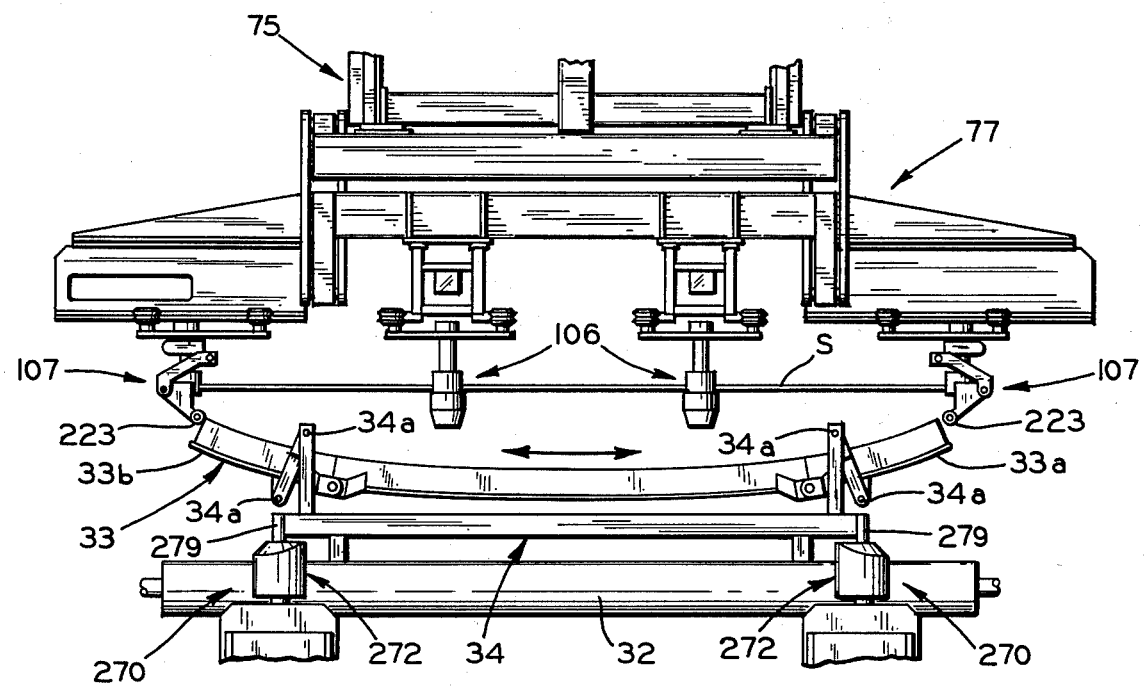
FIG. 25 is a front elevational view of the mold locating and locking mechanism and the articulated bending mold associated therewith, illustrating the longitudinal movement capability of such mold.

While the cocking assemblies 107 serve to facilitate self-aligning of the mold relative to the head 77 when necessary as described above, their primary purpose is to swing the pivotal end sections 33a and 33b of the mold from a closed position into an open position for receiving the paired flat sheets of glass. Accordingly, as the elevator approaches the end of its downstroke, the enlarged portions 226 of the mold engaging element 223 engage the lower flanges of the mold sections 33a and 33b (FIG. 14) to urge the same downwardly relative to the central portion of the mold. As the elevator 75 continues downwardly, the cocking assemblies 107 begin to collapse with their respective links 217,218 pivoting relative to the links 212,213 against the bias of springs 243 and 245, thereby allowing the upper portion or shaping rail of the mold to approach and then gingerly engage the undersurface of the glass sheets. As further collapsing of the cocking assemblies 107 occurs, the mold end portions 33,33b raise the glass upwardly therewith, causing the glass engaging gripper elements 187 to be lifted on their respective shafts 180 along with the glass sheets until the mold has fully opened, as shown in FIGS. 18 and 19, and the elevator 75 reaches the end of its downstroke.

When the elevator 75 reaches the end of its downward travel, a signal is generated to retract the secondary gripper units 146 and the primary gripper units 146 in sequence, leaving the glass sheets on the mold 33. Upon release of the secondary gripper units, the decrease in pressure reflected in the hydraulic line to the primary gripper units is detected by the pressure responsive switch to actuate valves 315 into an open position establishing communication between the head ends of cylinders 159 to the rod ends thereof. Thus, the lock cylinders 159 are released to permit retraction of the piston rods 161 of cylinders 158 and thereby slides 163 to disengage the primary gripper units from the glass sheets. As the slides 163 carrying the gripper units 146 retract, the block 175 of each gripper unit trips the actuating arm 170 of limit switch LS-2, indicating that the slide and associated gripper units are in their retracted position. When all slides and gripper units have been retracted, a signal is generated to energize motor 85 and raise elevator 75. This signal also energizes the motor 286 to rotate the shafts 271 and thereby locking heads 282.

Rotation of the control shaft 271 rotates cam 307 until the roller 302 of plunger 300 enters into the depression 312 to trip the switch LS-3 and generate a signal to deenergize the motor 286, which terminates rotation of the shafts 271 and causes the locking heads 282 to stop at their mold release position shown at the right in FIG. 24. This signal also activates the conveyor section to advance the glass-laden mold toward the furnace 35. After a short time delay for the mold to clear the locating-locking mechanism, motor 286 again is energized to return the locking heads 282 to their mold receiving or "home position" shown at the left in FIG. 24. The motor 286 is deenergized at this position by means of switch LS-4, which is actuated by plunger roller 303 entering into the depression 313 formed on cam 308.

As the elevator 75 reaches the top of its upstroke, motor 82 is deenergized and the motor 50 then becomes operative to shuttle the carriage 40 toward the glass pick-up position. As the carriage 40 approaches the end of its travel, a signal is generated reducing the speed of the carriage drive to a low level, allowing the motor 50 to stall when the carriage reaches the end of its travel against the bumper pads 71 of locator stops 66. The elevator 75 is then lowered to a "dwell" position just above infeed conveyor 37 in readiness for another cycle which is initiated by the entry of fresh paired sheets of glass onto pick-up conveyor section 246.

Figure 3:
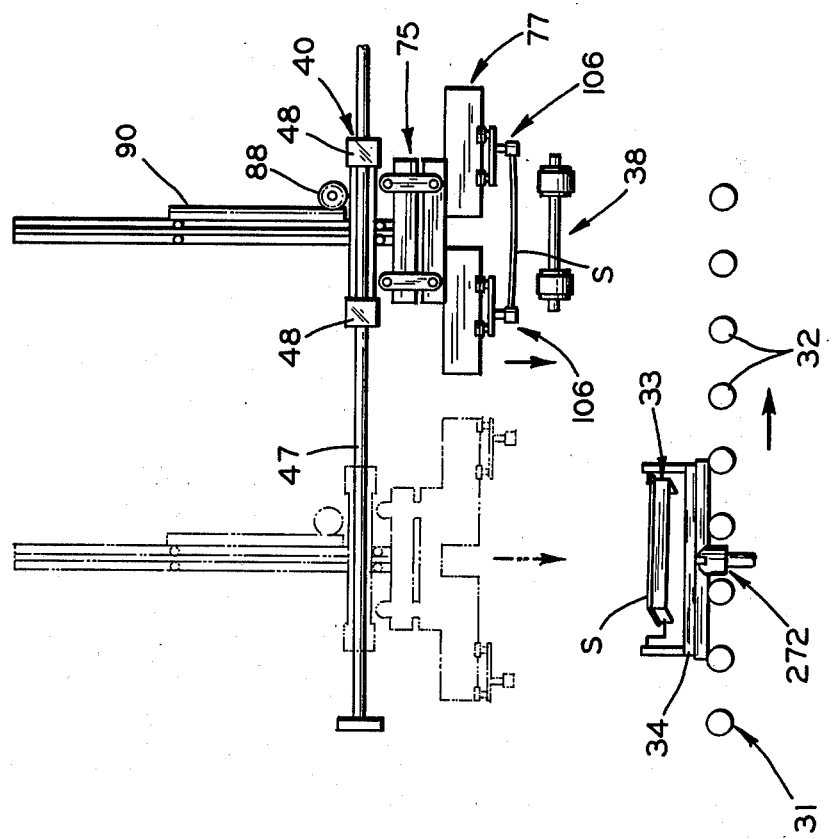
FIG. 3 is a schematic side elevational view of the apparatus for unloading bent glass sheets from a bending mold, looking in the direction of arrows 3—3 of FIG. 1.
Figure 27:
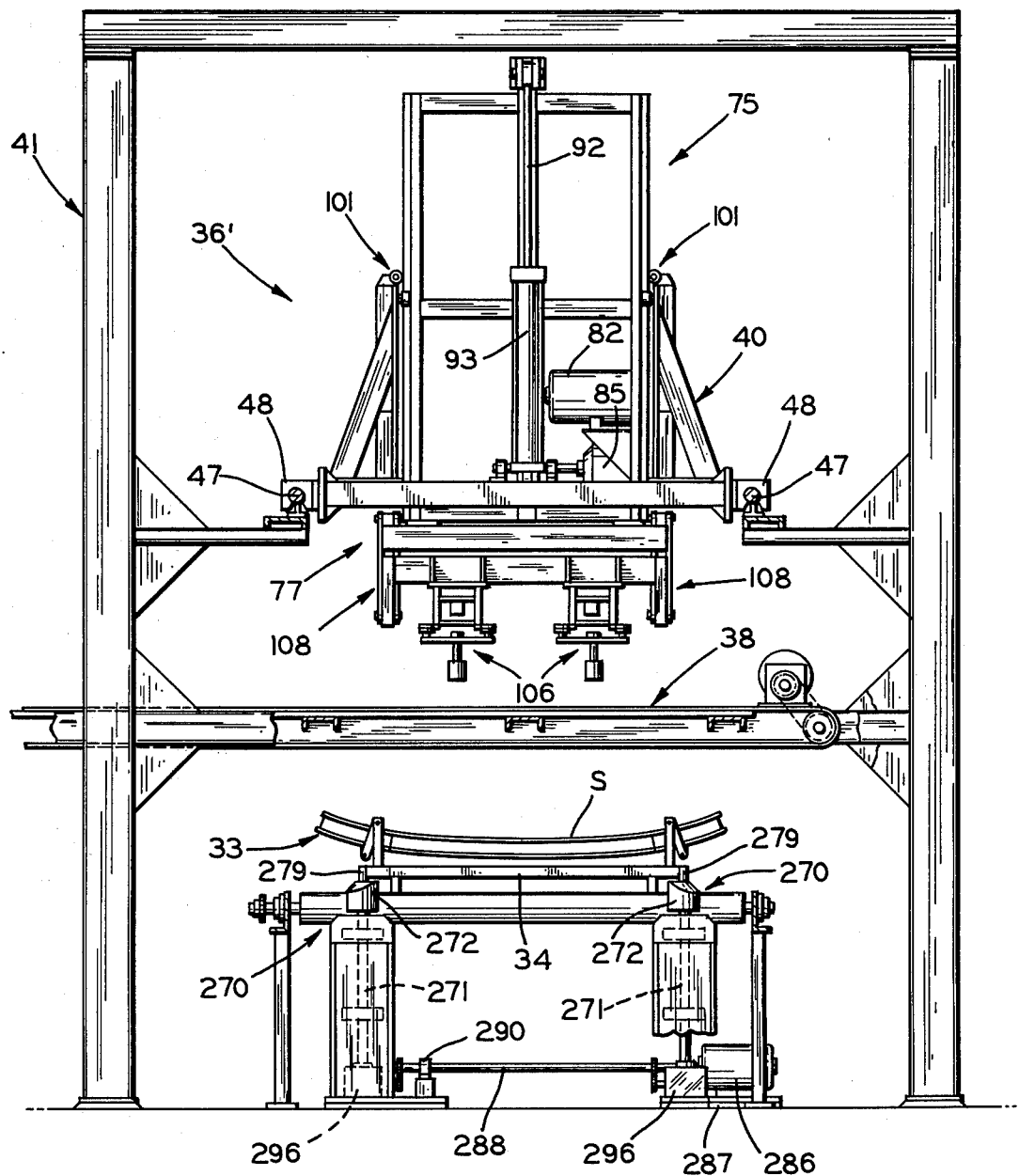
FIG. 27 is a front elevational view of the apparatus of this invention when employed to unload glass sheets from a bending mold.
Figure 28:
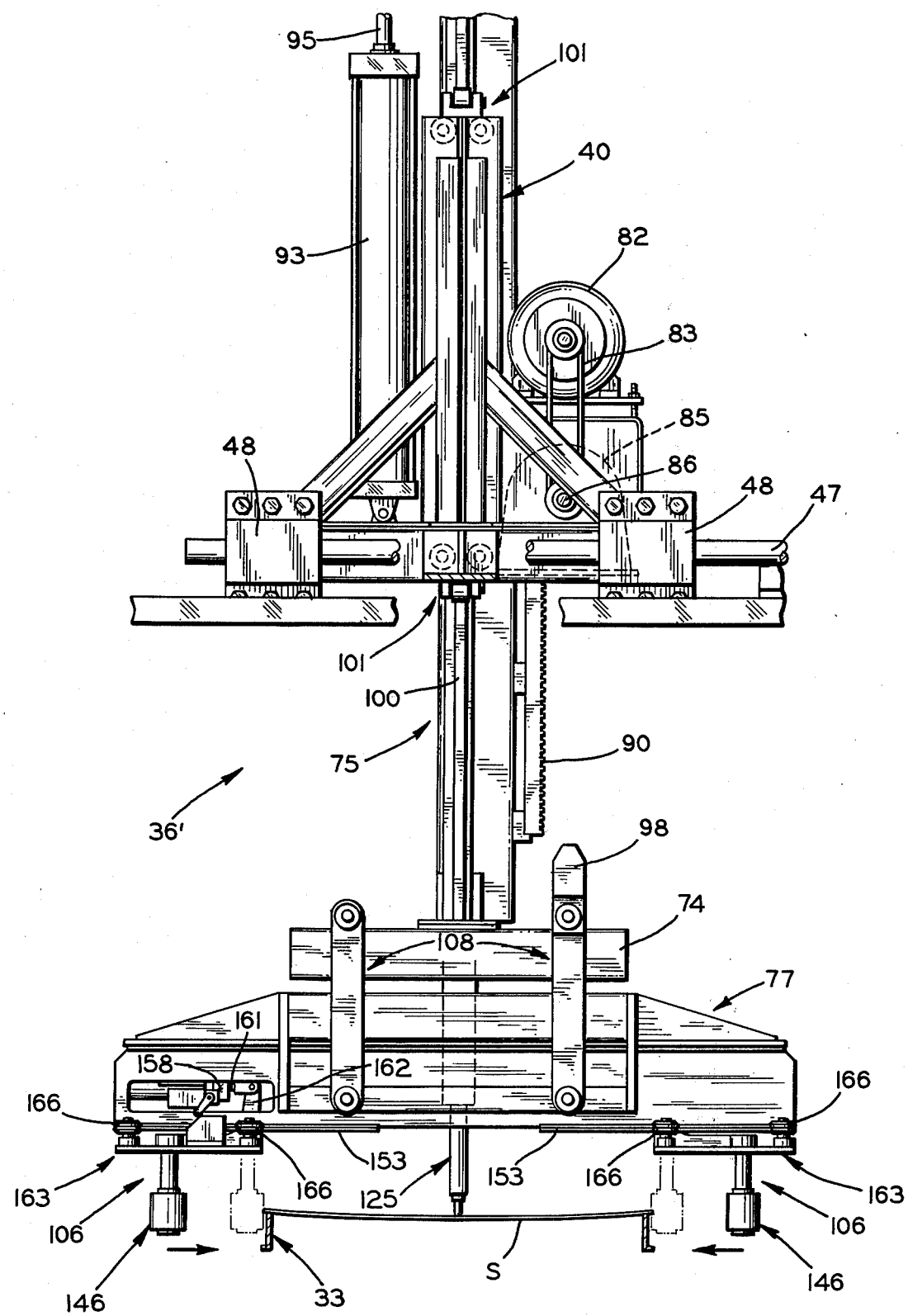
FIG. 28 is an enlarged side elevational view of the apparatus shown in FIG. 27.

The mold unloading apparatus 36' (FIGS. 27 and 28) is similar in construction to the mold loading apparatus 36 except for the absence of mold cocking assemblies 107 and the lack of cam elements 190 on the several gripper units 146. The cocking assemblies 107 are not required because the molds 33 remain in their closed positions after bending and during unloading of the glass therefrom. Nor are the cam elements 190 required since absolute vertical alignment of the molds relative to pick-up head 77 is not necessary for glass removal. Also, only four gripper units 146 are required, two on each side of the bent glass sheets. In other respects, the structure of unloading apparatus 36' is identical to the mold loading apparatus 36 and the same reference numerals are applied to identical parts. Apparatus 36' functions to remove paired bent sheets of glass (FIG. 3) from a mold and transfer the same onto the outfeed conveyor 38. It should be noted that the absence of glass sheets on the mold at the unloading station, such as might be incurred by breakage during the heating and bending cycle for example, will be sensed by the apparatus to preclude actuation of the several gripper units and the elevator 75 will be returned to its upper "dwell" position in readiness for the next glass removal operation. The glass-laden mold is located and locked in place by locators 270 identical in structure and operative in the same manner as those previously described in connection with the loading apparatus 36. Accordingly, a detailed description of the mode of unloading or removing bent glass sheets from the mold is not believed necessary.

Actuation of the several fluid cylinders is effected by conventional control valves, not shown. Proper sequencing of the operation of the many control valves, as well as the various motors and electrical signals, for effecting the foregoing operations can be effected by conventional limit switches (in addition to those described) and/or by conventional timers incorporated in the electrical control system, also not shown. Each of the switches and/or timers triggers subsequent stages of operation of the various cylinders and motors. Since such additional sequentially operable switches and timing arrangements are known and, per se, form no part of the present invention, it is not believed necessary to provide any further detailed description or amplification thereof.

From the foregoing, it is apparent that the objects of the present invention have been fully accomplished. As a result of this invention, a new and useful sheet material handling apparatus is provided for automatically loading one or more superimposed sheets of glass disposed in a horizontal plane onto an empty mold rapidly and smoothly preparatory to bending the glass sheets and for expeditiously removing bent sheets of glass from the molds after bending. The apparatus includes a glass pick-up head equipped with retractable grippers for gripping the marginal edges of horizontally disposed glass sheets without marring or damaging the same. Also, cocking assemblies are carried by the pick-up head for automatically opening the mold immediately prior to depositing glass sheets thereon. By the provision of mold locators, the molds are positioned and locked is place when loaded or unloaded by the overlying glass loading and unloading apparatus. The pick-up head, as well as the mold, are hingedly mounted for self-alignment relative to each other.

The apparatus of this invention is designed to accommodate a variety of glass or sheet material sizes and is compatible with molds of different outside dimensions and depths. The elevator has a dual stroke, capable of picking up sheet articles at one elevation and depositing the same at another elevation, the stroke being adjustable as dictated by the elevation of the infeed and outfeed conveyors and the depth of the molds or other article receiving supports utilized. The subject apparatus is especially suited for continuous operation in an automated production line under elevated temperature conditions while allowing attendants to be stationed sufficiently removed from the apparatus and the high temperature environment.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. A sheet handling apparatus comprising: an article pickup head, a plurality of opposed slides mounted on said head for translatory movement toward and away from each other, gripping members mounted on said slides, respectively, for movement therewith, and means on said head for moving said slides and the gripping members carried thereby for engagement with and disengagement from the opposite edges of at least one horizontally disposed sheet article, each of said gripping members comprising a shaft suspended from the associated slide thereof and an article engaging element mounted on said shaft for free sliding movement thereon, certain of said gripping members being provided with a cam element on said shaft below said article engaging element engageable with an article receiving support means beneath said head for self-aligning said head relative to said support means.

2. An apparatus according to claim 1, wherein said article engaging element is cylindrical in shape and is formed of a resiliently yieldable material.

3. An apparatus according to claim 1, wherein said cam element is fixedly secured on said shaft and comprises a generally cylindrical portion terminating in a tapered portion at the distal end thereof.

4. An apparatus according to claim 1, wherein said means for moving each of said slides comprises a fluid cylinder having a piston rod connected to said slide, and wherein certain of said slides are provided with means for locking the associated fluid cylinder to maintain the piston rod thereof in a fixed extended position.

5. A sheet handling apparatus comprising: an article pickup head, a plurality of opposed slides mounted on said head for translatory movement toward and away from each other, gripping members mounted on said slides, respectively, for movement therewith, means on said head for moving said slides and the gripping members carried thereby for engagement with and disengagement from the opposite edges of at least one horizontally disposed sheet article, each of said gripping members comprising a shaft suspended from the associated slide thereof and an article engaging element mounted on said shaft for free sliding movement thereon, and an articulated support means below said head for receiving said article from said head, said articulated support means being pivotal between an open position and a closed position, certain of said gripping members being provided with means mounted on said shaft below said article engaging element engageable with end portions of said articulated support means for pivoting said articulated support means into an open position for receiving said article.

6. An apparatus according to claim 5, wherein said gripping member means for pivoting said articulated support means comprises a link assembly spring biased in an open position and collapsible upon engagement with said support means end portions against said spring bias.

7. An apparatus according to claim 5, wherein said article engaging element is cylindrical in shape and is formed of a resiliently yieldable material.

8. A sheet handling apparatus comprising: an article pickup head, a plurality of opposed slides mounted on said head for translatory movement toward and away from each other, gripping members mounted on said slides, respectively, for movement therewith, means on said head for moving said slides and the gripping members carried thereby for engagement with and disengagement from the opposite edges of at least one horizontally disposed sheet article, a vertically reciprocal elevator and means hingedly mounting said head on said elevator, a support means below said head for receiving said article, and means on said head for self-aligning said head relative to said support means immediately prior to depositing said article thereon, said self-aligning means including cam elements engageable with said support for displacing said head relative to said support into self-alignment therewith.

9. An apparatus according to claim 8, including a conveyor for supporting and advancing an article receiving support below said head, and means positioning said support on said conveyor in vertical registry with said overlying head.

10. An apparatus according to claim 9, wherein said positioning means comprises lock means engageable with said article receiving support for securing said support in said vertical registry with said head.

11. An apparatus according to claim 10, wherein said article receiving support includes a pair of spaced pins extending downwardly therefrom and said lock means comprises a pair of locking heads formed with pin receiving slots and rotatable between a mold receiving position and a mold locking position.

12. An apparatus according to claim 11, including means for rotating said locking heads in unison in opposite directions.

13. A sheet handling apparatus comprising: an article pickup head, a plurality of opposed slides mounted on said head for translatory movement toward and away from each other, gripping members mounted on said slides, respectively, for movement therewith, means on said head for moving said slides and the gripping members carried thereby for engagement with and disengagement from the opposite edges of at least one horizontally disposed sheet article, means for moving said pickup head from an article pickup station to an article discharge station to transfer said article from a first location to a second location while being maintained in said substantially horizontal plane, said moving means comprising a horizontally reciprocal carriage and an elevator mounted on said carriage for vertical reciprocal movement relative thereto, means hingedly mounting said head on said elevator for limited free movement relative thereto, and means for restraining said head against said free movement when said head is in its uppermost position relative to said carriage.

14. An apparatus according to claim 13, including an article support means at said discharge station below said head for receiving said article, and means on said head for self-aligning said head relative to said article support means.

15. A method of handling sheet articles comprising: supporting a sheet article in a generally horizontal plane at a first location, providing a pickup head movable in vertical and horizontal directions from said first location to a second location, said head having a plurality of opposed grippers suspended therefrom and movable toward and away from each other, moving said head above said first location, sensing the presence of said sheet article at said first location and disposing said grippers in laterally spaced relation to said sheet article, moving said grippers toward each other to engage opposite edges of said article and grasp said article therebetween while disposed in said horizontal plane, moving said head to transfer said article from said first location to said second location, advancing an empty article support means on a conveyor in a horizontal path to a predetermined position at said second location below said head, temporarily locking said article support means in said predetermined position, aligning said head with said article support means, and retracting said grippers away from each other to deposit said article on said article support means while the latter is in said predetermined position.

* * * * *